(12) United States Patent
Otani et al.

(10) Patent No.: US 10,068,160 B2
(45) Date of Patent: Sep. 4, 2018

(54) IMAGE PROCESSING APPARATUS AND METHOD FOR CONTROLLING THE SAME

(71) Applicant: CANON KABUSHIKI KAISHA, Tokyo (JP)

(72) Inventors: Ryosuke Otani, Tokyo (JP); Yoichi Takikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/983,944

(22) Filed: Dec. 30, 2015

(65) Prior Publication Data

US 2016/0196481 A1 Jul. 7, 2016

(30) Foreign Application Priority Data

Jan. 7, 2015 (JP) .................... 2015-001869
Oct. 26, 2015 (JP) .................... 2015-210178

(51) Int. Cl.
*G06K 15/00* (2006.01)
*H04N 1/405* (2006.01)
*G06K 15/02* (2006.01)
*B41J 2/475* (2006.01)
*G06K 15/12* (2006.01)
*H04N 1/191* (2006.01)

(52) U.S. Cl.
CPC .......... *G06K 15/1881* (2013.01); *B41J 2/475* (2013.01); *G06K 15/1247* (2013.01); *G06K 15/1868* (2013.01); *G06K 15/1876* (2013.01); *H04N 1/191* (2013.01)

(58) Field of Classification Search
CPC .......... G06K 15/1881; G06K 15/1247; G06K 15/1868; G06K 15/1876; B41J 2/475; H04N 1/191
USPC .................... 358/3.06, 3.1, 3.13–3.19, 3.3
See application file for complete search history.

(56) References Cited

U.S. PATENT DOCUMENTS

2012/0262750 A1* 10/2012 Kinoshita .......... G06K 15/1247
 358/1.14
2014/0300934 A1* 10/2014 Nakamura ............. H04N 1/405
 358/3.13

FOREIGN PATENT DOCUMENTS

JP 2009-179062 A 8/2009

* cited by examiner

*Primary Examiner* — Quang N Vo
(74) *Attorney, Agent, or Firm* — Canon USA, Inc. I.P. Division

(57) ABSTRACT

An image forming apparatus includes a light emitting element group including a plurality of light emitting elements disposed at first intervals in a first direction, and configured to emit optical beams based on image data, a lens array including a plurality of lenses disposed at second intervals different from the first intervals in the first direction and configured to focus or condense the light emitted from the light emitting element group, and a halftone processing unit configured to perform halftone processing by using a dither matrix corresponding to a relative positional relationship between the plurality of light emitting elements and the plurality of lenses to generate the image data.

19 Claims, 33 Drawing Sheets

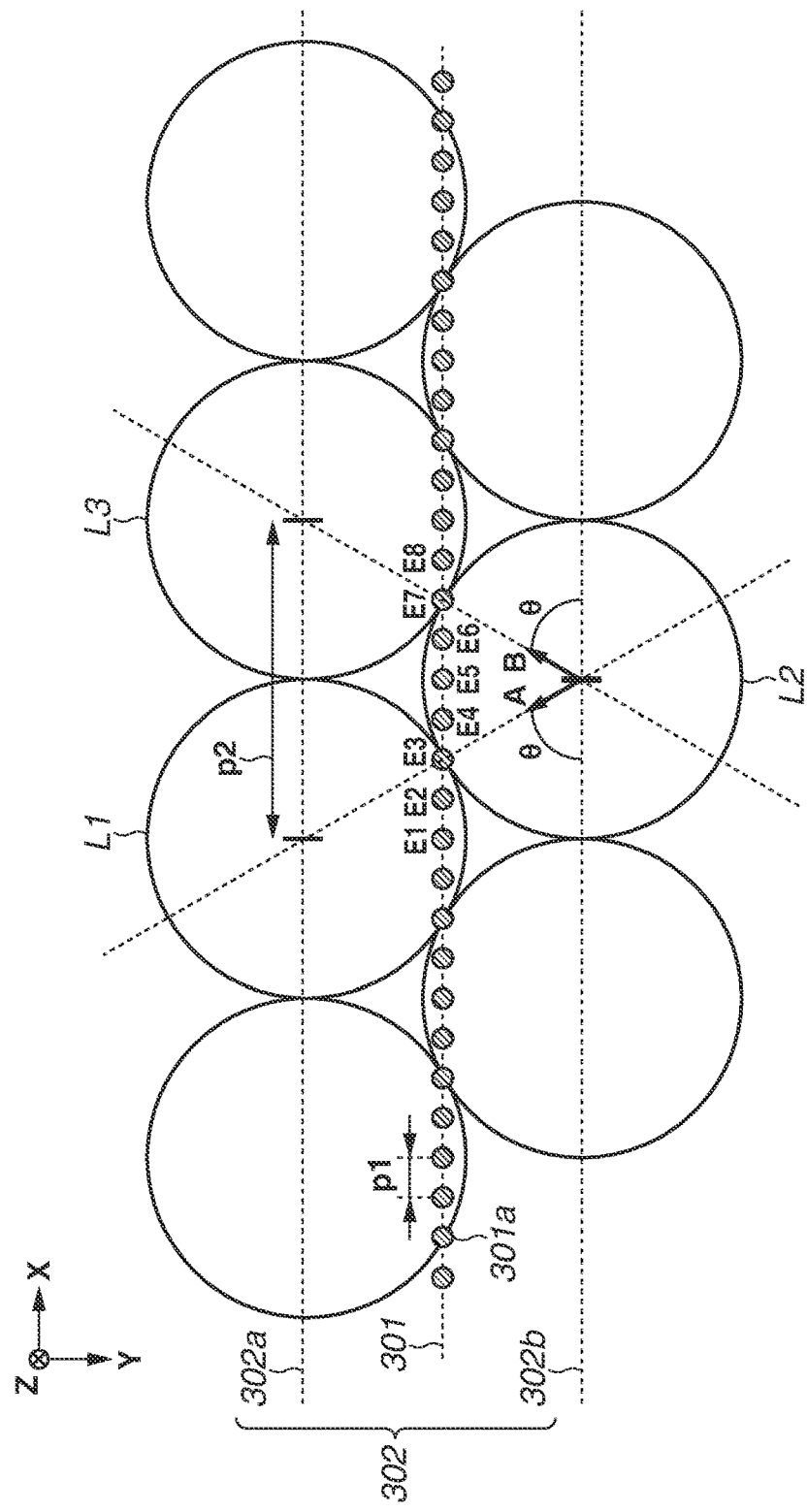

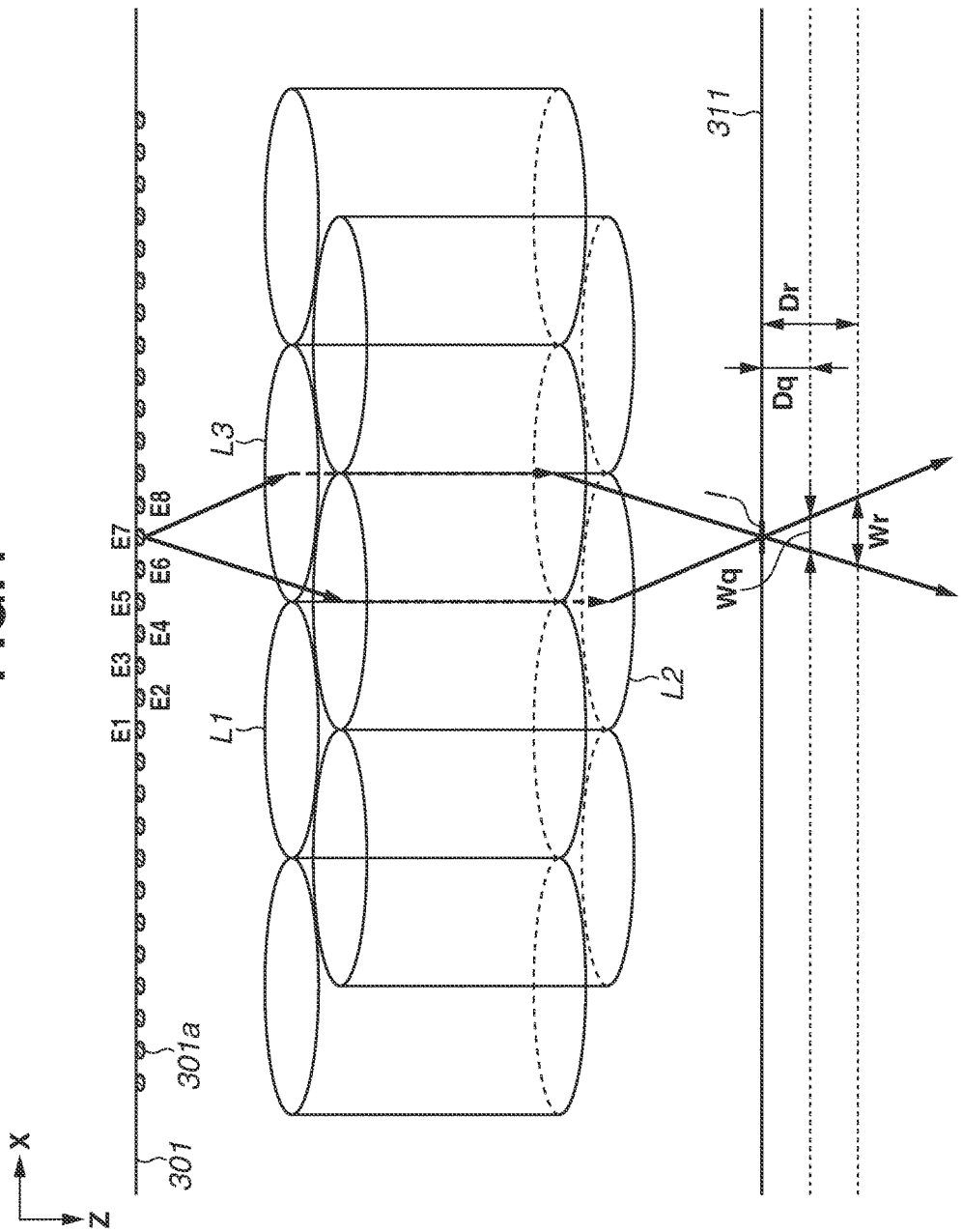

FIG.11

| OUTPUT IMAGE SIGNAL | ENLARGING ORDER | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 16 | 32 | 48 | 64 | 80 | 96 | 112 | 128 | 144 | 160 | 176 | 192 | 208 | 224 | 240 |
| 1 | 1 | 17 | 33 | 49 | 65 | 81 | 97 | 113 | 129 | 145 | 161 | 177 | 193 | 209 | 225 | 241 |
| 2 | 2 | 18 | 34 | 50 | 66 | 82 | 98 | 114 | 130 | 146 | 162 | 178 | 194 | 210 | 226 | 242 |
| 3 | 3 | 19 | 35 | 51 | 67 | 83 | 99 | 115 | 131 | 147 | 163 | 179 | 195 | 211 | 227 | 243 |
| 4 | 4 | 20 | 36 | 52 | 68 | 84 | 100 | 116 | 132 | 148 | 164 | 180 | 196 | 212 | 228 | 244 |
| 5 | 5 | 21 | 37 | 53 | 69 | 85 | 101 | 117 | 133 | 149 | 165 | 181 | 197 | 213 | 229 | 245 |
| 6 | 6 | 22 | 38 | 54 | 70 | 86 | 102 | 118 | 134 | 150 | 166 | 182 | 198 | 214 | 230 | 246 |
| 7 | 7 | 23 | 39 | 55 | 71 | 87 | 103 | 119 | 135 | 151 | 167 | 183 | 199 | 215 | 231 | 247 |
| 8 | 8 | 24 | 40 | 56 | 72 | 88 | 104 | 120 | 136 | 152 | 168 | 184 | 200 | 216 | 232 | 248 |
| 9 | 9 | 25 | 41 | 57 | 73 | 89 | 105 | 121 | 137 | 153 | 169 | 185 | 201 | 217 | 233 | 249 |
| 10 | 10 | 26 | 42 | 58 | 74 | 90 | 106 | 122 | 138 | 154 | 170 | 186 | 202 | 218 | 234 | 250 |
| 11 | 11 | 27 | 43 | 59 | 75 | 91 | 107 | 123 | 139 | 155 | 171 | 187 | 203 | 219 | 235 | 251 |
| 12 | 12 | 28 | 44 | 60 | 76 | 92 | 108 | 124 | 140 | 156 | 172 | 188 | 204 | 220 | 236 | 252 |
| 13 | 13 | 29 | 45 | 61 | 77 | 93 | 109 | 125 | 141 | 157 | 173 | 189 | 205 | 221 | 237 | 253 |
| 14 | 14 | 30 | 46 | 62 | 78 | 94 | 110 | 126 | 142 | 158 | 174 | 190 | 206 | 222 | 238 | 254 |
| 15 | 15 | 31 | 47 | 63 | 79 | 95 | 111 | 127 | 143 | 159 | 175 | 191 | 207 | 223 | 239 | 255 |

| ELEMENT NUMBER i | | PHASE INFORMATION Ep(i) |
|---|---|---|
| | 0 | 0.000 |
| | 1 | 0.125 |
| | 2 | 0.250 |
| | 3 | 0.375 |
| | 4 | 0.500 |
| | 5 | 0.625 |
| | 6 | 0.750 |
| | 7 | 0.875 |
| | 8 | 0.000 |
| | 9 | 0.125 |
| | 10 | 0.250 |
| | 11 | 0.375 |
| | 12 | 0.500 |
| | 13 | 0.625 |
| | 14 | 0.750 |
| | 15 | 0.875 |
| | 16 | 0.000 |
| | 17 | 0.125 |
| | 18 | 0.250 |
| | 19 | 0.375 |
| | 20 | 0.500 |
| | 21 | 0.625 |
| | 22 | 0.750 |
| | 23 | 0.875 |
| | ⋮ | ⋮ |
| | 6993 | 0.000 |
| | 6994 | 0.125 |
| | 6995 | 0.250 |
| | 6996 | 0.375 |
| | 6997 | 0.500 |
| | 6998 | 0.625 |
| | 6999 | 0.750 |
| | 7000 | 0.875 |

FIG.23

| DENSITY DIFFERENCE | BLUR AMOUNT W(i) | DISTORTION DIRECTION θ(i) |
|---|---|---|
| ⋮ | | |
| -0.5 | 50% | B |
| -0.4 | 40% | B |
| -0.3 | 30% | B |
| -0.2 | 20% | B |
| -0.1 | 10% | B |
| 0 | 0% | A |
| 0.1 | 10% | A |
| 0.2 | 20% | A |
| 0.3 | 30% | A |
| 0.4 | 40% | A |
| 0.5 | 50% | A |
| ⋮ | | |

FIG.24

| ELEMENT NUMBER i | | DISTORTION DIRECTION θ(i) | BLUR AMOUNT W(i) |
|---|---|---|---|
| | 0 | A | 0% |
| | 1 | A | 2% |
| | 2 | A | 4% |
| | 3 | A | 6% |
| | 4 | B | 8% |
| | 5 | B | 10% |
| | 6 | B | 12% |
| | 7 | B | 14% |
| | 8 | A | 16% |
| | 9 | A | 18% |
| | 10 | A | 20% |
| | 11 | A | 22% |
| | 12 | B | 24% |
| | 13 | B | 26% |
| | 14 | B | 28% |
| | 15 | B | 30% |
| | 16 | A | 31% |
| | 17 | A | 32% |
| | 18 | A | 33% |
| | 19 | A | 34% |
| | 20 | B | 35% |
| | 21 | B | 36% |
| | 22 | B | 37% |
| | 23 | B | 38% |
| | ⋮ | ⋮ | ⋮ |
| | 6993 | A | 14% |
| | 6994 | A | 12% |
| | 6995 | A | 10% |
| | 6996 | A | 8% |
| | 6997 | B | 6% |
| | 6998 | B | 4% |
| | 6999 | B | 2% |
| | 7000 | B | 0% |

FIG.28

|        | X-AXIS DIRECTION → |       |       |       |       |       |       |       |
|--------|--------|-------|-------|-------|-------|-------|-------|-------|
|        | (1,1) | (2,1) | (3,1) | (4,1) | (5,1) | (6,1) | (7,1) | (8,1) |
|        | (1,2) | (2,2) | (3,2) | (4,2) | (5,2) | (6,2) | (7,2) | (8,2) |
|        | (1,3) | (2,3) | (3,3) | (4,3) | (5,3) | (6,3) | (7,3) | (8,3) |
|        | (1,4) | (2,4) | (3,4) | (4,4) | (5,4) | (6,4) | (7,4) | (8,4) |
| Y-AXIS DIRECTION | (1,5) | (2,5) | (3,5) | (4,5) | (5,5) | (6,5) | (7,5) | (8,5) |
|        | (1,6) | (2,6) | (3,6) | (4,6) | (5,6) | (6,6) | (7,6) | (8,6) |
|        | (1,7) | (2,7) | (3,7) | (4,7) | (5,7) | (6,7) | (7,7) | (8,7) |
|        | (1,8) | (2,8) | (3,8) | (4,8) | (5,8) | (6,8) | (7,8) | (8,8) |

FIG.30

X-AXIS DIRECTION →

| 1 | 2 | 3 | 4 | 5 | 1 | 2 | 3 |
| 1 | 2 | 3 | 4 | 5 | 1 | 2 | 3 |
| 1 | 2 | 3 | 4 | 5 | 1 | 2 | 3 |
| 1 | 2 | 3 | 4 | 5 | 1 | 2 | 3 |
| 1 | 2 | 3 | 4 | 5 | 1 | 2 | 3 |
| 1 | 2 | 3 | 4 | 5 | 1 | 2 | 3 |
| 1 | 2 | 3 | 4 | 5 | 1 | 2 | 3 |
| 1 | 2 | 3 | 4 | 5 | 1 | 2 | 3 |

Y-AXIS DIRECTION ↓

FIG.32

|   |   |   |   |   |   |   |   |
|---|---|---|---|---|---|---|---|
| (1,1) | (2,1) | (3,1) | (4,1) | (5,1) | (6,1) | (7,1) | (8,1) |
| (1,2) | (2,2) | (3,2) | (4,2) | (5,2) | (6,2) | (7,2) | (8,2) |
| (1,1) | (2,1) | (3,1) | (4,1) | (5,1) | (6,1) | (7,1) | (8,1) |
| (1,2) | (2,2) | (3,2) | (4,2) | (5,2) | (6,2) | (7,2) | (8,2) |
| (1,1) | (2,1) | (3,1) | (4,1) | (5,1) | (6,1) | (7,1) | (8,1) |
| (1,2) | (2,2) | (3,2) | (4,2) | (5,2) | (6,2) | (7,2) | (8,2) |
| (1,1) | (2,1) | (3,1) | (4,1) | (5,1) | (6,1) | (7,1) | (8,1) |
| (1,2) | (2,2) | (3,2) | (4,2) | (5,2) | (6,2) | (7,2) | (8,2) |

X-AXIS DIRECTION →

Y-AXIS DIRECTION ↓

FIG.33

|  |  | P1(x) | | | |
|---|---|---|---|---|---|
|  |  | 128 | 256 | 384 | ... |
| P2(y) | 1 | M[128,1] | M[256,1] | M[384,1] | ... |
| | 2 | M[128,2] | M[256,2] | M[384,2] | ... |

IMAGE PROCESSING APPARATUS AND METHOD FOR CONTROLLING THE SAME

BACKGROUND OF THE INVENTION

Field of the Invention

The present disclosure relates to an image processing apparatus for forming an image based on the electrophotographic process, and a method for controlling the image processing apparatus.

Description of the Related Art

In an electrophotographic image forming apparatus such as a laser beam printer and a copying machine, an exposure unit emits optical beams according to an exposure signal, forms an electrostatic latent image on the surface of a photosensitive member, and develops the electrostatic latent image through toner adhesion thereto. As an exposure method employed in the exposure unit of this electrophotographic image forming apparatus, the light emitting diode (LED) exposure method and the laser exposure method are known. In an LED exposure type image forming apparatus, light emitted from LED elements serving as light emitting elements is condensed on a photosensitive drum by lenses, respectively. A plurality of the LED elements is arranged in the longitudinal direction of the photosensitive drum, and a plurality of the lenses is respectively arranged in the longitudinal direction of the photosensitive drum between the LED elements and the photosensitive drum. A laser exposure type image forming apparatus includes a light source unit for emitting laser light from a semiconductor laser element as a light emitting element, and a deflect and scan unit for deflecting the laser light from the light source unit for scanning by using a polygon mirror. The laser exposure type image forming apparatus further includes a plurality of lenses for guiding the laser light from the light source unit to the deflect and scan unit, and focusing the deflected and scanned laser light on an image bearing member by the deflect and scan unit.

In the LED exposure type image forming apparatus, since reducing the lens size to about the pixel pitch is difficult, the arrangement interval of the lenses is larger than that of the light emitting elements. Accordingly, because of the difference in positional relationship between the optical axis of each light emitting element and the optical axis of each lens, a plurality of spot areas (areas irradiated with the light emitted from the light emitting elements via the lenses) is distorted in shape in respectively different directions. In the laser exposure type image forming apparatus, spot areas are distorted in shape in different directions according to the longitudinal position on the photosensitive drum. Such spot areas distorted in shape in different directions cause a problem that periodical density nonuniformity occurs in an output image.

Japanese Patent Application Laid-Open No. 2009-179062 discusses a technique for correcting the energy of the light emitted from each light emitting element to provide a uniform size (diameter) of distorted spot area in the distortion direction.

However, in the technique for correcting the energy of the light emitted from each light emitting element discussed in Japanese Patent Application Laid-Open No. 2009-179062, it is necessary to acquire an optimum correction amount for each light emitting element, resulting in complicated processing.

SUMMARY OF THE INVENTION

The present disclosure is directed to a technique capable of easily restraining the influence of spot areas distorted in shape and forming an image in which density nonuniformity due to the distortion is restrained.

According to an aspect of the present disclosure, an image processing apparatus configured to generate image data to be used by an image forming apparatus to perform image forming, the image forming apparatus including, a plurality of light emitting elements disposed at first intervals in a first direction, and configured to emit optical beams based on the image data, and a plurality of lenses disposed at second intervals different from the first intervals in the first direction, and configured to focus the light emitted from the plurality of the light emitting elements on an image plane, the image processing apparatus includes a storage unit configured to store a plurality of dither matrices respectively corresponding to different halftone dot patterns, and a halftone processing unit configured to perform halftone processing by using one of the plurality of the dither matrices corresponding to a relative positional relationship between the plurality of light emitting elements and the plurality of lenses to generate the image data.

According to other aspects of the present disclosure, one or more additional image processing apparatuses, one or more methods for controlling an image processing apparatus and one or more storage mediums are discussed herein. Further features of the present disclosure will become apparent from the following description of exemplary embodiments with reference to the attached drawings.

BRIEF DESCRIPTION OF THE DRAWINGS

FIG. 3 is a plan view illustrating light emitting elements and a lens array arrangement in the exposure unit.

FIG. 4 is a side view illustrating the exposure unit and a photosensitive drum arrangement.

FIG. 11 is a table illustrating a threshold value group for determining gradations of an output image signal.

FIG. 13 is a table illustrating an example of spot information according to the first exemplary embodiment.

FIG. 23 is a table illustrating a relationship between an image density difference and spot information.

FIG. 24 is a table illustrating an example of spot information according to the second exemplary embodiment.

FIG. 28 is a diagram illustrating examples of pixel positions (x, y).

FIG. 30 is a diagram illustrating examples of pixel phases P(x).

FIG. 32 is a diagram illustrating examples of pixel phases P(x, y).

FIG. 33 is a table illustrating examples of dither matrices according to a fourth exemplary embodiment.

DESCRIPTION OF THE EMBODIMENTS

Exemplary embodiments of the present disclosure will be described in detail below with reference to the accompanying drawings. The following exemplary embodiments are to be considered as illustrative examples for achieving the present disclosure, and may be changed, modified, and combined as required depending on the configuration and other various conditions of an apparatus to which at least one aspect of the present disclosure is applied.

Figure 1:
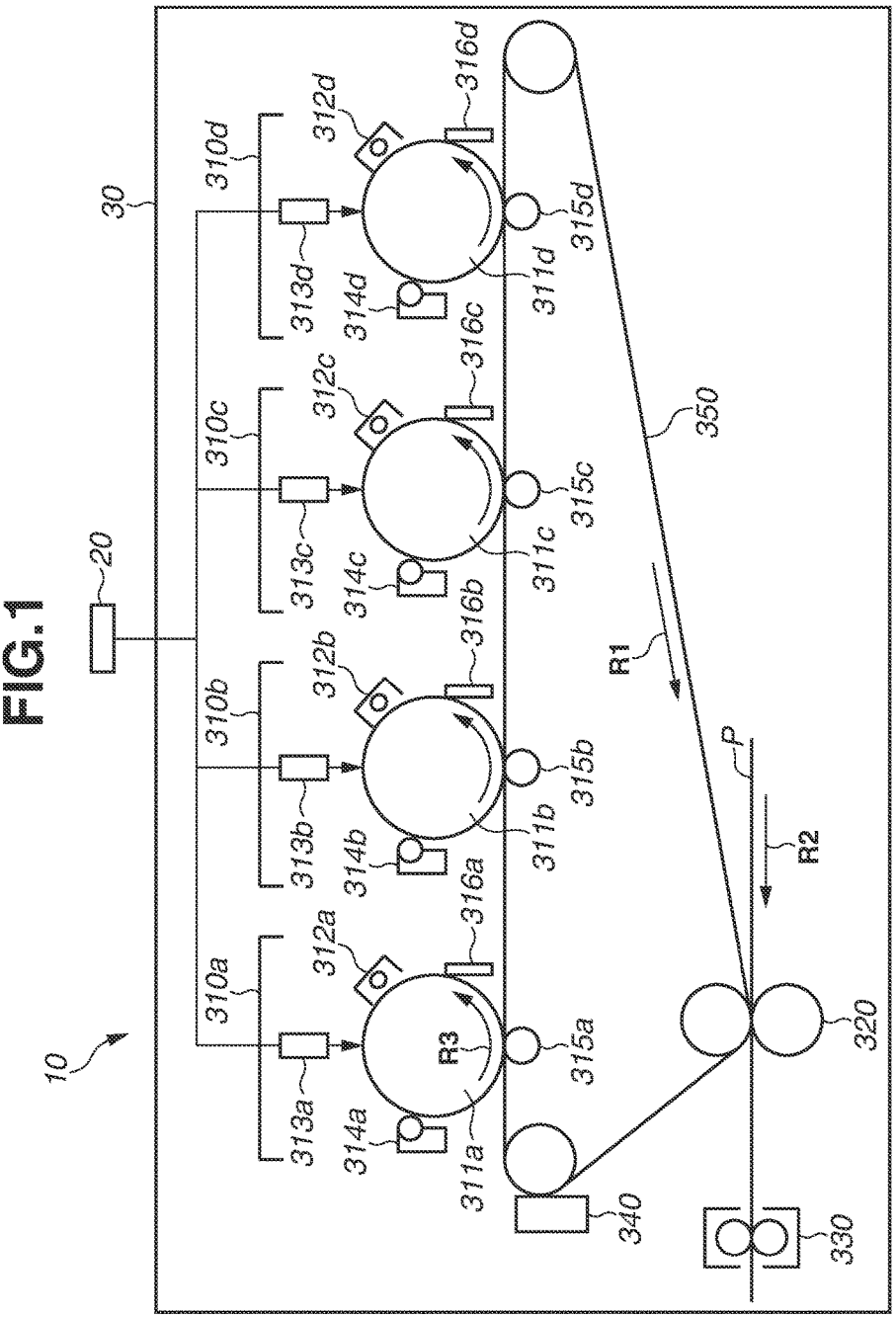
FIG. 1 is a diagram illustrating an example configuration of an image forming system according to a first exemplary embodiment.

FIG. 1 is a diagram illustrating an example configuration of an image forming system according to a first exemplary embodiment.

An image forming system 10 includes an image processing apparatus 20 and an image forming apparatus 30. The image processing apparatus 20 and the image forming apparatus 30 are connected with each other via a wireless communication interface or circuit. The image processing apparatus 20 converts input image data into image data to be output to the image forming apparatus 30. The image forming apparatus 30 forms an image on a recording medium by using the electrophotographic process based on the image data input from the image processing apparatus 20.

The image processing apparatus 20 may be implemented, for example, by a printer driver installed on a general personal computer. In this case, each unit of the image processing apparatus 20 (described below) is implemented by a computer executing a predetermined program. As another configuration, for example, the image forming apparatus 30 may include the image processing apparatus 20.

<Image Forming Apparatus 30>

The configuration of the image forming apparatus 30 will be specifically described below.

The image forming apparatus 30 includes image forming units 310a to 310d, a secondary transfer unit 320, a fixing unit 330, and an intermediate transfer belt cleaning unit 340. The image forming units 310a to 310d, the secondary transfer unit 320, and the intermediate transfer belt cleaning unit 340 are disposed along the intermediate transfer belt 350 that moves in the direction indicated by the arrow R1. The fixing unit 330 is disposed on the downstream side of the secondary transfer unit 320 along a recording medium P moving in the direction indicated by the arrow R2.

The image forming units 310a, 310b, 310c, and 310d form toner images on respective photosensitive drums by using respective color toners, and primarily transfer them onto the intermediate transfer belt 350.

Generally, the image forming apparatus 30 uses toners of four different colors of cyan (C), magenta (M), yellow (Y), and black (K). In the present exemplary embodiment, the image forming unit 310a uses the K toner, the image forming unit 310b uses the C toner, the image forming unit 310c uses the M toner, and the image forming unit 310d uses the Y toner. The image forming units and toner colors to be used are not limited to the four types. For example, light toner and clear toner may be used. Further, the arrangement order of the image forming units of respective colors is not limited to that described in the present exemplary embodiment, and may be any desired order.

The image forming unit 310a includes a photosensitive drum 311a, a charging unit 312a, an exposure unit 313a, a development unit 314a, a primary transfer unit 315a, and a cleaning unit 316a. Since the image forming units 310b, 310c, and 310d have a similar configuration to that of the image forming unit 310a, the configuration of only the image forming unit 310a will be described below.

The photosensitive drum 311a includes an organic photoconductor layer having a negative charging polarity on the outer circumferential surface, and can rotate in the direction indicated by the arrow R3.

The charging unit 312a, applied with a negative voltage, irradiates the surface of the photosensitive drum 311a with charged particles to uniformly charge the surface of the photosensitive drum 311a to a negative potential. Based on image data supplied from the image processing apparatus 20, the exposure unit 313a emits optical beams onto the photosensitive drum 311a to expose the surface of the photosensitive drum 311a to light, thus forming an electrostatic latent image on the surface of the relevant photosensitive drum 311a. The exposure unit 313a is able to output an exposure signal having a plurality of gradations. More specifically, the exposure unit 313a is able to control the exposure intensity according to the image data (intensity modulation). The exposure unit 313a may control the light emission time length according to the image data (pulse width modulation).

By using a developing roller rotating at an approximately constant speed, the development unit 314a supplies negatively charged toner onto the photosensitive drum 311a with an electrostatic latent image formed thereon. The negatively charged toner adheres to the electrostatic latent image on the photosensitive drum 311a based on the development characteristics. The primary transfer unit 315a, applied with a positive voltage, primarily transfers a toner image borne by the negatively charged photosensitive drum 311a onto the intermediate transfer belt 350 moving in the direction indicated by the arrow R1.

The cleaning unit 316a removes residual toner remaining on the photosensitive drum 311a that has passed through the primary transfer unit 315a. When forming a color image, the image forming units 310a, 310b, 310c, and 310d for respective colors perform the above-described processes (charging, exposure, development, primary transfer, and cleaning) at predetermined different timings. As a result, an image composed of overlapped toner images of four colors is formed on the intermediate transfer belt 350.

The secondary transfer unit 320 secondarily transfers the toner image borne by the intermediate transfer belt 350 onto a recording medium P moving in the direction indicated by the arrow R2. The fixing unit 330 performs pressurizing and heating processes on the recording medium P with the toner image secondarily transferred thereon to fix it. The intermediate transfer belt cleaning unit 340 removes residual toner remaining on the intermediate transfer belt 350 that has passed the secondary transfer unit 320.

This completes the electrophotographic image forming in the image forming apparatus 30.

Figure 2:
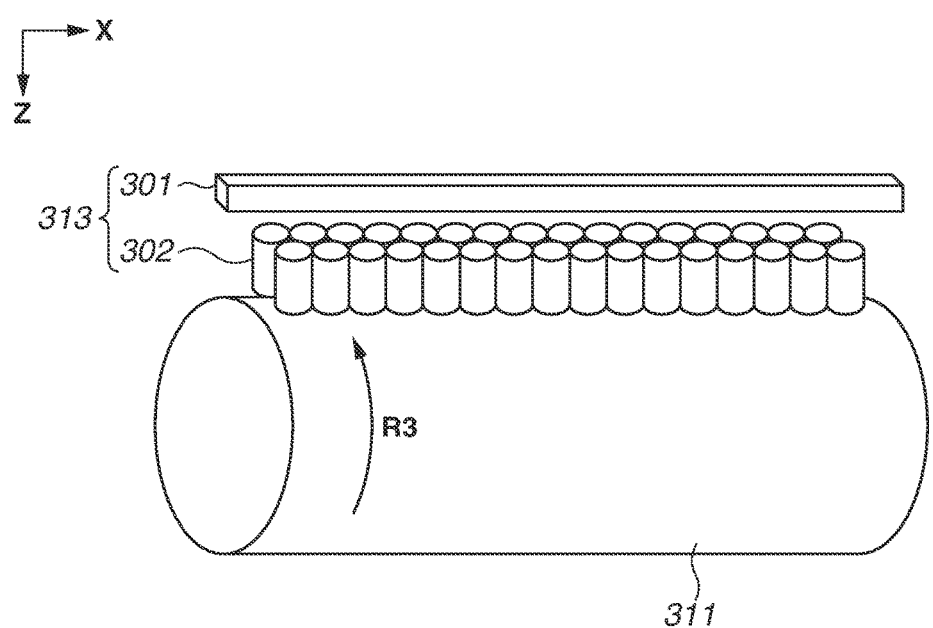
FIG. 2 is a diagram illustrating an example configuration of an exposure unit.

Next, exposure processing in the image forming apparatus 30 will be described. The image forming apparatus 30 according to the present exemplary embodiment performs the exposure processing on the surface of a photosensitive drum, for example, based on the LED exposure method. FIG. 2 illustrates a configuration of exposure units 313a to 313d. Since the exposure units 313a to 313d have a similar configuration, each of these units will be described below as an exposure unit 313. The exposure unit 313 includes a LED element group (a light emitting element group) 301 and a lens group (a lens array) 302. The LED element group 301 is a light emitting device including a plurality of LED elements and disposed along the longitudinal direction of the photosensitive drum 311 (X-axis direction).

The lens group 302 including a plurality of lenses is disposed along the X-axis direction, similar to the above-described LED elements. The light emitted from the LED element group 301 passes through the lens group 302 and is condensed on the photosensitive drum 311 to expose the photosensitive drum 311 to light for scanning in the direction indicated by the arrow R3.

FIG. 3 is a plan view illustrating the configuration of the LED element group 301 and the lens group 302 when viewed along the optical axis direction of the lenses (Z-axis direction). As illustrated in FIG. 3, the LED elements 301a configuring the LED element group 301 are arranged in a row at intervals p1 along the X-axis direction.

The lens group 302 includes two different lens groups 302a and 302b arranged in two rows along the X-axis direction and in a staggered pattern. The lens groups 302a and 302b in respective rows are adjacently arranged at different positions shifted in phase by a half of the interval p2 (p2/2). More specifically, the lenses of respective rows are adjacently disposed along directions A and B each being inclined with respect to the X-axis direction by an angle θ (60 degrees in FIG. 3). In this way, a plurality of lenses configuring the lens group 302 is planarly arranged in the X and the A (or B) directions. The interval p2 is different from the interval p1 between the LED elements 301a (p2>p1) in the present exemplary embodiment. The light emitted from each LED element 301a passes through a plurality of proximal lenses, and is focused on the photosensitive drum 311. Since the arrangement interval p1 of the LED element group 301 is different from the arrangement interval p2 of the lens group 302, the relative positional relationship between a LED element and lenses differs for each LED element.

Focusing on LED elements E1 to E8 out of a plurality of the LED elements 301a, the adjacent arrangement direction of the lenses that allow passage mainly of the light emitted from each of the LED elements E1 to E8 differs according to the position relative to the lenses. For example, the light emitted from the LED element E3 mainly passes through the lenses L1 and L2 adjacent along the direction A and then is focused on the photosensitive drum 311. On the other hand, the light emitted from the LED element E7 mainly passes through the lenses L2 and L3 adjacent along the direction B and then is focused on the photosensitive drum 311. Therefore, the shape of each spot areas formed on the surface of the photosensitive drum 311 differ between the LED elements E3 and E7. The shape of each spot area is determined by the relative positional relationship between the LED element and the lenses.

FIG. 4 illustrates the configuration of the LED element group 301 and the lens group 302 when viewed from the side of the lens group 302 (Y-axis direction). As indicated by the arrows illustrated in FIG. 4, the light emitted from the one LED element 301a (for example, the LED element E7) passes through a plurality of the proximal lenses L2 and L3 and then is focused on a lens image-forming surface I. In this state, when the defocus amount D between the surface of the photosensitive drum 311 and the lens image-forming surface I changes, for example, to Dq and Dr, the blur amount W of a spot area formed on the surface of the photosensitive drum 311 changes to Wq and Wr, respectively. In other words, the blur amount W of the spot area increases with increasing defocus amount D from the lens image-forming surface I.

Figure 5A:
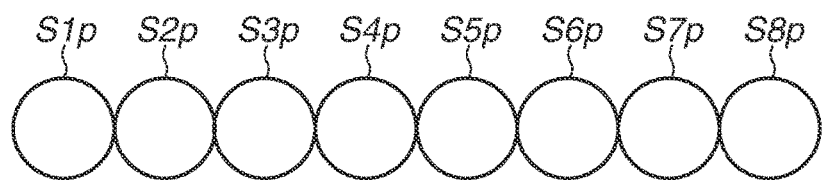
FIG. 5A is a schematic diagram illustrating spot areas formed on a surface P of a photosensitive drum.
Figure 5B:
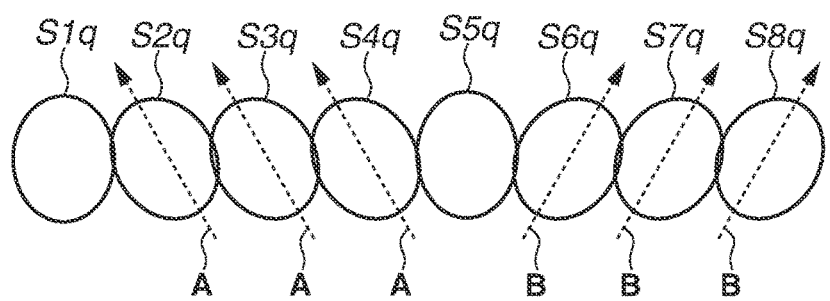
FIG. 5B is a schematic diagram illustrating spot areas formed on a surface Q having a larger defocus amount than the surface P of the photosensitive drum.
Figure 5C:
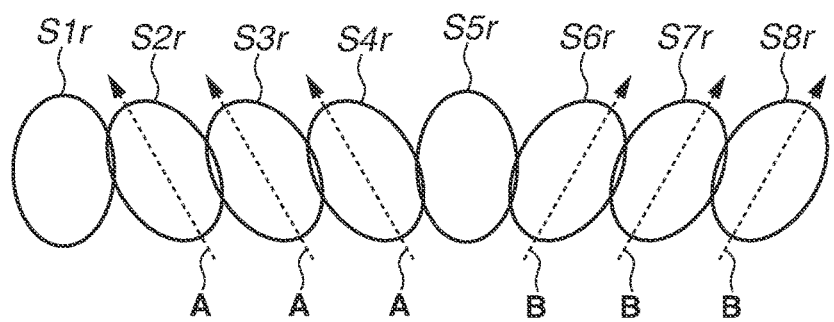
FIG. 5C is a schematic diagram illustrating spot areas formed on a surface R having a larger defocus amount than the surface Q of the photosensitive drum.

FIGS. 5A, 5B, and 5C are schematic diagrams illustrating the shapes of spot areas S formed on the surface of the photosensitive drum 311 by the light emitted from the LED elements E1 to E8, respectively, on the surfaces with different defocus amounts D thereon. FIG. 5A illustrates spot areas S1p to S8p formed on a surface P of the photosensitive drum 311 by the light emitted from the LED elements E1 to E8, respectively. FIG. 5B illustrates spot areas S1q to S8q formed on a surface Q of the photosensitive drum 311 by the light emitted from the LED elements E1 to E8, respectively, when the surface Q has the larger defocus amount D than the surface P. FIG. 5C illustrates spot areas S1r to S8r formed on a surface R of the photosensitive drum 311 by the light emitted from the LED elements E1 to E8, respectively, when the surface R has the larger defocus amount D than the surface Q. In this case, a defocus amount Dp on the surface P is 0%, an amount Dq on the surface Q is 25%, and the defocus amount Dr on the surface R is 50%.

As illustrated in FIGS. 5A to 5C, the shapes of the spot areas S respectively formed by the LED elements E1 to E8 differ according to the positional relationship between the relevant LED elements and the lenses. The blur amount W of the spot area S changes according to the defocus amount D. For example, the spot areas S1p to S8p formed on the surface P by the LED elements E1 to E8, respectively, are approximately round shaped since the surface P does not incur defocusing, as illustrated in FIG. 5A. On the other hand, the spot areas S1q to S8q formed on the surface Q by the LED elements E1 to E8, respectively, are elliptically shaped since the surface Q incurs defocusing, as illustrated in FIG. 5B. In this case, the major axis of each ellipse is provided in the adjacent arrangement direction (direction A or B) of a plurality of the lenses that allow passage mainly of the light emitted from each LED element E. Further, the spot areas S1$r$ to S8$r$ formed on the surface R by the LED elements E1 to E8, respectively, are elliptically shaped since the surface R has the larger defocus amount D than the surface Q, as illustrated in FIG. 5C. In this case, the major axis (the blur amount W in the distortion direction) of each ellipse of the spot areas S1$r$ to S8$r$ is longer than that of each ellipse of the spot areas S1$q$ to S8$q$. Further, as illustrated in FIGS. 5B and 5C, the spot shape inclination (the distortion direction of each spot area) due to defocusing is repeated by line symmetry.

As described above, differences in distortion direction and distortion amount (blur amount) between the spot areas S cause gradation nonuniformity in images output from the image forming apparatus 30 in comparison with a case where the shapes of the spot areas S are circularly formalized. When performing halftone processing by using a dither matrix for representing pseudo halftones with halftone dots having a predetermined halftone dot pattern, the above-described density nonuniformity becomes obvious. This point will be described below.

Figure 6:
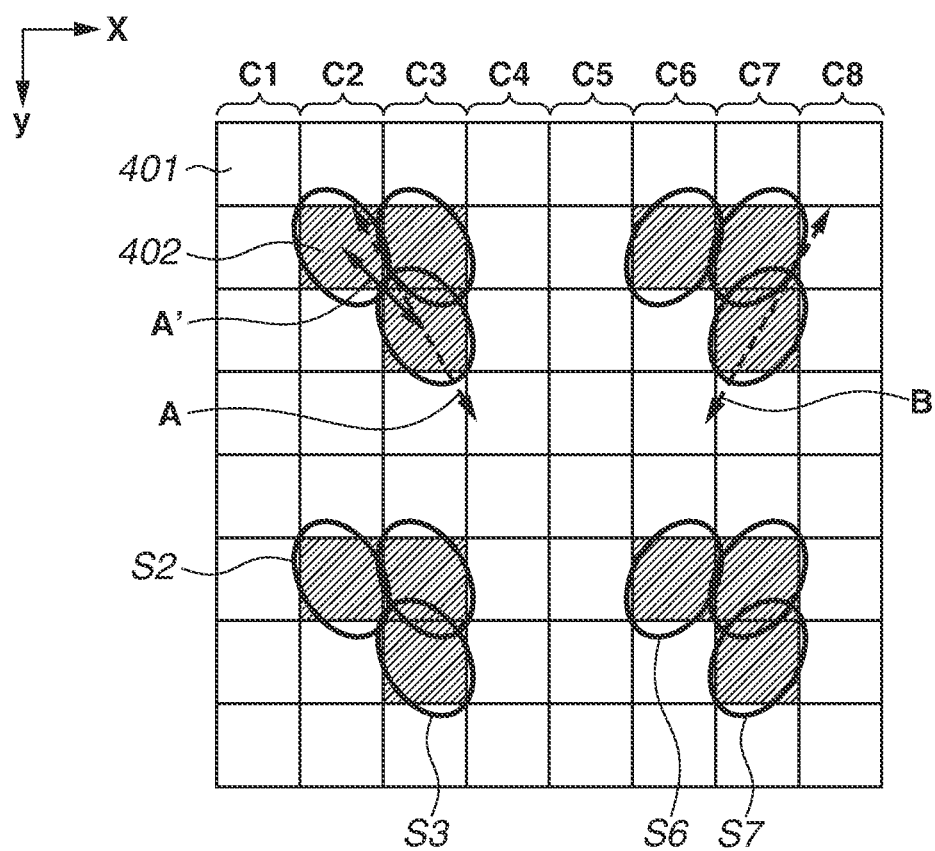
FIG. 6 is a schematic diagram illustrating a predetermined halftone dot pattern and spot areas.

FIG. 6 is a schematic diagram illustrating a state of spot areas when halftone processing is performed by using a predetermined dither matrix (first dither matrix). Referring to FIG. 6, a grid 401 corresponds to a pixel, and a shaded portion 402 indicates a lighting pixel to which an LED element emits an optical beam. In this way, in halftone processing, pseudo halftones according to the area of each halftone dot and the interval between halftone dots are represented by arranging many halftone dots (or graticules) at equal intervals.

Columns C1 to C8 illustrated in FIG. 6 are image data corresponding to the LED elements E1 to E8, respectively. Elliptically shaped areas illustrated in FIG. 6 indicate the shapes of spot areas formed on the surface of the photosensitive drum 311 by the light emitted from the LED elements E1 to E8 when defocusing occurs. FIG. 6 illustrates spot areas S2, S3, S6, and S7 formed by the light emitted from the LED elements E2, E3, E6, and E7, respectively.

In the pixel columns C2 to C4, there are many lighting contour pixels obliquely adjacent in a direction A', which is approximately the same oblique direction as the direction A and is the distortion direction of the spot areas S. In such areas, the spot areas S are irradiated with light in a mutually overlapped manner, and therefore halftone dots are stably formed, and therefore, provide dense gradations. On the other hand, in the pixel columns C6 to C8, there are fewer lighting contour pixels obliquely adjacent in the same direction as the direction B, which is the distortion direction of the spot areas S. In such areas, the spot areas S are not irradiated with light in a mutually overlap manner, and therefore halftone dots are not stably formed, and therefore, provide faint gradations.

More specifically, when the distortion direction differs for each spot area S, performing halftone processing by using the same dither matrix causes different image densities resulting in density nonuniformity. More specifically, density nonuniformity occurs at intervals of the difference in the distortion direction between the spot areas S (at intervals of the relative position between the LED element E and the lens L).

Depending on image forming conditions, the area of the pixel columns C6 to C8 may provide denser gradations than the area of the pixel columns C2 to C4. Even if shading correction processing for correcting the above-described density nonuniformity based on input gradations in advance, variations in the stability of halftone dot forming due to the difference in the distortion direction of the spot areas are not solved. Therefore, density variations become obvious because of variations in development conditions.

In the present exemplary embodiment, therefore, the image processing apparatus 20 performs halftone processing by using different dither matrices depending on the distortion directions of the spot areas S. More specifically, the image processing apparatus 20 stores a first dither matrix corresponding to a first halftone dot pattern, and a second dither matrix corresponding to a second halftone dot pattern. The second halftone dot pattern is composed of halftone dots in a mirror image relationship with halftone dots of the first halftone dot pattern. More specifically, the second halftone dot pattern is a reflection of the first halftone dot pattern with respect to the lens array arrangement direction (x direction) or a direction (y direction) perpendicularly intersecting with the lens array arrangement direction as an axis of reflection. The image processing apparatus 20 selects either the first or the second dither matrix according to the distortion directions of the spot areas S and then performs halftone processing.

Figure 7:
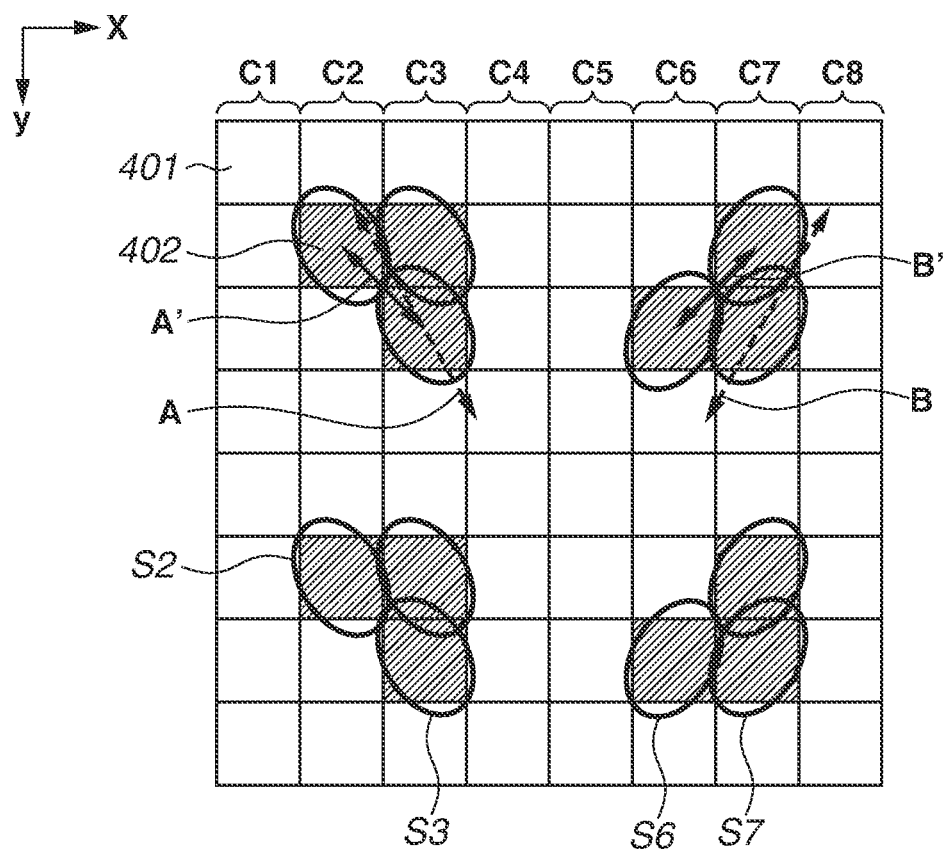
FIG. 7 is a schematic diagram illustrating spot areas in a halftone dot pattern according to the distortion direction of spot areas.

FIG. 7 is a schematic diagram illustrating conditions of spot areas when the image processing apparatus 20 selects a dither matrix according to the distortion directions of the spot areas S and then performs halftone processing. In halftone processing, the image processing apparatus 20 selects either the first or the second dither matrix whichever enables generating a halftone dot pattern having more lighting contour pixels obliquely adjacent in approximately the same oblique direction as the adjacent arrangement direction of the lenses that allow passage mainly of the light emitted from each light emitting element E, and then generates image data.

For example, as illustrated in FIGS. 5A, 5B, and 5C, suppose that the distortion directions of the spot areas by the LED elements E2 to E4 are the direction A, and the distortion directions of the spot areas by the LED elements E6 to E8 are the direction B. In this case, the image processing apparatus 20 performs halftone processing by using the first dither matrix in the areas of the pixel columns C2 to C4, and by using the second dither matrix in the areas of the pixel columns C6 to C8. The first and the second dither matrices will be described in detail below. In this way, the image processing apparatus 20 selects either the first or the second dither matrix according to the distortion directions of the spot areas S, and generates image data. This enables image forming with restrained density nonuniformity due to spot area distortion. Further, stable halftone dot forming is achieved by selecting a dither matrix for generating a halftone dot pattern having more lighting contour pixels obliquely adjacent in approximately the same oblique direction as the adjacent arrangement direction of the lenses.

<Image Processing Apparatus 20>

Figure 8:
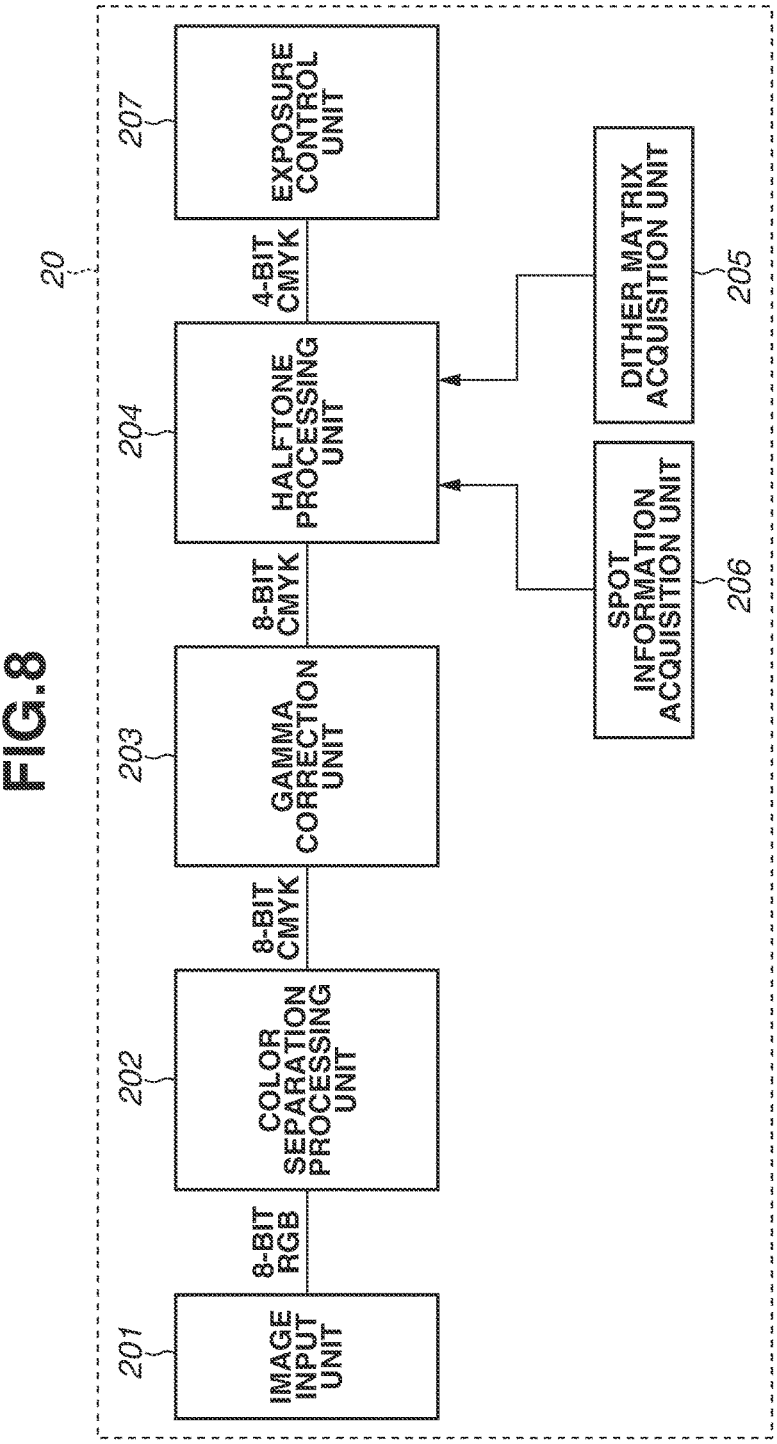
FIG. 8 is a block diagram illustrating an example configuration of an image processing apparatus according to the first exemplary embodiment.

Next, the configuration of the image processing apparatus 20 for performing the above-described halftone processing will be described. FIG. 8 is a block diagram illustrating the configuration of the image processing apparatus 20. The image processing apparatus 20 includes an image input unit 201, a color separation processing unit 202, a gamma correction unit 203, a halftone processing unit 204, a dither matrix acquisition unit 205, a spot information acquisition unit 206, and an exposure control unit 207.

The image input unit 201 receives multi-value input image data (for example, 8-bit RGB color image data) from an external apparatus, and outputs the input image data to the color separation processing unit 202. The color separation processing unit 202 converts the input image data input from the image input unit 201 into 8-bit CMYK color image data.

Although, in the above-described case, RGB data is input as input image data. However, for example, image data corresponding to CMYK colors can also be directly input from an external apparatus. In this case, the color separation processing unit 202 does not need to perform color conversion processing.

Referring to a density correction table prepared and pre-stored, the gamma correction unit 203 performs gamma correction processing on the CMYK color image data output by the color separation processing unit 202 to convert the data into gamma-corrected CMYK color image data.

The halftone processing unit 204 performs dither method-based halftone processing on the gamma-corrected 8-bit CMYK color image data to convert the data into 4-bit CMYK color image data, and outputs the resultant data to the exposure control unit 207. The halftone processing unit 204 refers to a dither matrix acquired from a dither matrix storage unit (not illustrated) by the dither matrix acquisition unit 205, and spot information acquired from a spot information storage unit (not illustrated) by the spot information acquisition unit 206. The halftone processing unit 204 performs halftone processing based on the dither matrix and the spot information corresponding to each pixel.

Figure 9:
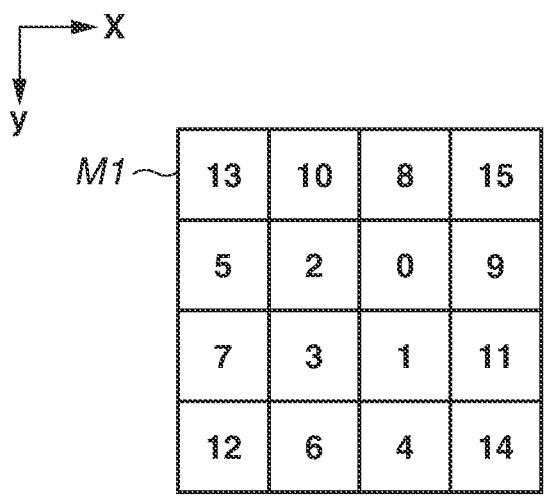
FIG. 9 is a diagram illustrating an example of a first dither matrix.
Figure 10:
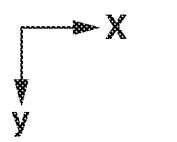
FIG. 10 is a diagram illustrating an example of a second dither matrix.

The dither matrix acquisition unit 205 acquires a first dither matrix M1 and a second dither matrix M2 describing the enlarging order (growing order) of halftone dots, and a threshold value group T for determining the gradations of the output image data for the gradations of the input image data. FIG. 9 illustrates an example of the first dither matrix M1 stored in the dither matrix storage unit. FIG. 10 illustrates an example of the second dither matrix M2 stored in the dither matrix storage unit. FIG. 11 illustrates an example of the threshold value group T stored in the dither matrix storage unit.

In the dither matrices M1 and M2 illustrated in FIGS. 9 and 10, one grid corresponds to one pixel, and the number given to each grid indicates the enlarging order of halftone dots generated corresponding to the dither matrix. FIGS. 9 and 10 illustrate dither matrices composed of 16 pixels. The shape of a dither matrix is not limited thereto, and may be arbitrarily set. Halftone processing can be performed on the entire image by entirely arranging these dither matrices on the input image.

Figure 12:
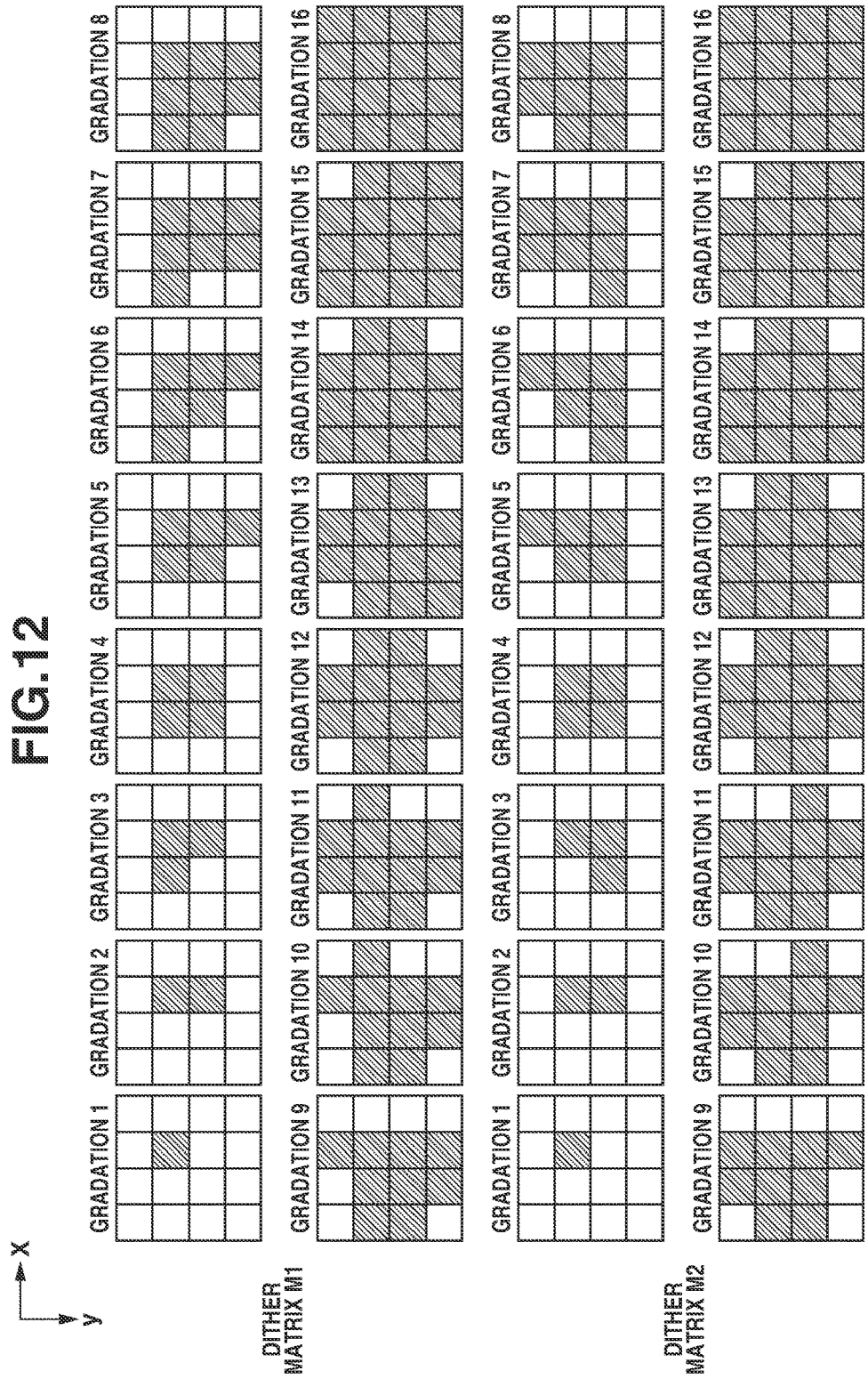
FIG. 12 is a diagram illustrating halftone dot patterns formed by using dither matrices.

FIG. 12 illustrates halftone dot patterns (dither patterns) respectively formed by the first dither matrix M1 and the second dither matrix M2. In the second dither matrix M2, the enlarging order is set to form a mirror pattern in each halftone dot pattern of the same gradation in the first dither matrix M1. More specifically, the second dither matrix M2 is a reflection of the first halftone dot pattern formed by the first dither matrix M1 with respect to the x direction as an axis of reflection so that the centroid position remains at approximately the same position. Therefore, in each dither matrix, the halftone dot patterns of the same gradation are formed so as to include the same number of lighting contour pixels obliquely adjacent in different directions. Further, halftone dot patterns are formed so that the halftone dot centroid of each first halftone dot pattern and the halftone dot centroid of each second halftone dot pattern are at approximately the same position. This enables forming an image in which density nonuniformity due to halftone dot centroid is restrained.

In a case of a screen other than 90 degrees or a complicated dither matrix, using a mirror image pattern in gradations denser than the intermediate gradation with which halftone dots begin to connect may cause unstable toner adhesion at a portion where halftone dots begin to connect. Therefore, the enlarging order in the second dither matrix M2 may be set so that the mirror image pattern of the first halftone dot pattern may be obtained only in gradations at highlighted portions where each halftone dot pattern is isolated (isolated halftone dot pattern). When the first dither matrix M1 is a rectangular matrix, a matrix formed simply by inverting the first dither matrix M1 may be used as the second dither matrix M2. In this case, although the centroid position may differ, the second dither matrix M2 can be obtained from the first dither matrix M1, therefore, the need of a storage area for storing the second dither matrix M2 can be eliminated.

FIG. 11 illustrates the threshold value group T in which threshold values are associated with pixels having respective enlarging orders in the dither matrix. In the threshold value group T, 16 threshold values are associated with one pixel. For example, 16 threshold values from 0 to 15 are set to the pixel having the enlarging order "0". The threshold value group T is set in a range of the density value of the input image (0 to 255). With the 16 threshold values, the halftone processing unit 204 determines the gradation (0 to 15) of the output image data with respect to the gradation (0 to 255) of the input image data. A method for determining the gradation of the output image data will be described in detail below.

The spot information acquisition unit 206 acquires phase information Ep(i) of the lens for each light emitting element. FIG. 13 illustrates the phase information Ep(i) of the lens corresponding to each light emitting element E(i) (i is the element number) stored in the spot information storage unit. The phase information Ep(i) indicates a relative positional relationship between the light emitting element and the lens. In this case, the phase information Ep(i) is a ratio indicating a point in the lens interval at which each light emitting element is disposed. The phase information Ep(i) is represented by a value equal to or larger than 0 and smaller than 1.

The spot information storage unit stores a lens interval Lf, a light emitting element interval Ef, and an initial phase Ep(0) of the light emitting element. The spot information acquisition unit 206 may calculate the phase information Ep(i) of the lens for each light emitting element E(i), for example, based on the following formula.

$$Ep(i)=(Ep(0)+Ef/Lf \times i)-\text{floor}(Ep(0)+Ef/Lf \times i) \quad (1)$$

where floor(x) is a function for extracting the integral part of x.

The halftone processing unit 204 selects either the dither matrix M1 or M2 according to the above-described phase information Ep(i), based on the spot information (phase information Ep(i)) corresponding to the target pixel. Then, based on the selected dither matrix and the threshold value group T illustrated in FIG. 11, the halftone processing unit 204 performs halftone processing for converting the gradation of 8-bit input image data into a 4-bit output image signal.

For example, when a threshold value Th(j, k) corresponds to a gradation k of the output image signal in terms of an enlarging order j, the relationship between a gradation value In of the input image and an output image signal Out is as follows.

Out = 0 when In ≤ $Th(j, 0)$,

Out = 1 when $Th(j, 0) < $ In ≤ $Th(j, 1)$,

Out = 2 when $Th(j, 1) < $ In ≤ $Th(j, 2)$,

Out = 3 when $Th(j, 2) < $ In ≤ $Th(j, 3)$,

...

Out = 14 when $Th(j, 13) < $ In ≤ $Th(j, 14)$,

Out = 15 when $Th(j, 14) < $ In.

The halftone processing unit 204 outputs the thus-converted 4-bit output image signal to the exposure control unit 207. The exposure control unit 207 emits optical beams on the photosensitive drum 311a based on the image data input from the halftone processing unit 204.

<Hardware Configuration of Image Processing Apparatus 20>

Figure 14:
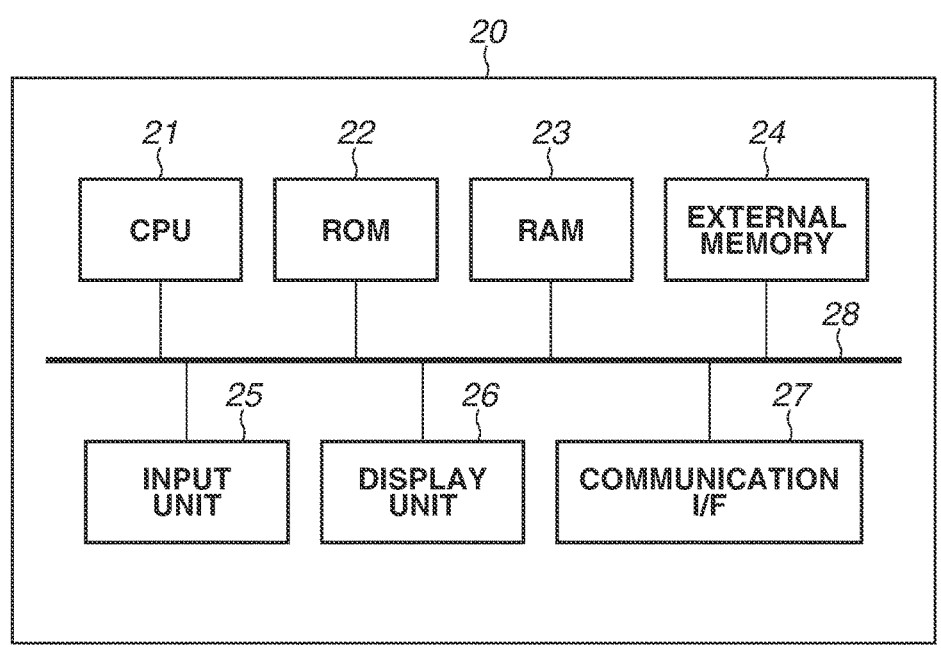
FIG. 14 is a block diagram illustrating an example hardware configuration of the image processing apparatus.

FIG. 14 illustrates an example hardware configuration of the image processing apparatus 20. The image processing apparatus 20 includes a central processing unit (CPU) 21, a read only memory (ROM) 22, a random access memory (RAM) 23, an external memory 24, an input unit 25, a display unit 26, a communication interface (I/F) 27, and a system bus 28.

The CPU 21 integrally controls operations of the image processing apparatus 20, more specifically, controls the components 22 to 27 via the system bus 28. The ROM 22 is a nonvolatile memory for storing control programs necessary for the CPU 21 to perform processing. The programs may be stored in the external memory 24 or a detachably attached storage medium (not illustrated).

The RAM 23 functions as a main memory and a work area for the CPU 21. More specifically, the CPU 21 loads a required program from the ROM 22 into the RAM 23 and then executes the program to implement various functional operations.

The external memory 24 stores, for example, various data and various information required for the CPU 21 to perform processing by using a program. The external memory 24 stores, for example, various data and various information acquired as a result of processing performed by using a program by the CPU 21. The external memory 24 includes the above-described dither matrix storage unit and spot information storage unit. The input unit 25 including, for example, a keyboard, a mouse allows an operator to give an instruction to the image processing apparatus 20.

The display unit 26 includes a monitor such as a liquid crystal display (LCD). The communication I/F 27 is an interface for communicating with an external apparatus such as the image forming apparatus 30. The communication I/F 27 is, for example, a wireless communication interface.

The system bus 28 connects the CPU 21, the ROM 22, the RAM 23, the external memory 24, the input unit 25, the display unit 26, and the communication I/F 27 to enable communication therebetween. The function of each unit of the image processing apparatus 20 illustrated in FIG. 8 is implemented by the CPU 21 executing a program stored in the ROM 22 or the external memory 24.

<Halftone Processing Procedure in Image Processing Apparatus 20>

Figure 15:
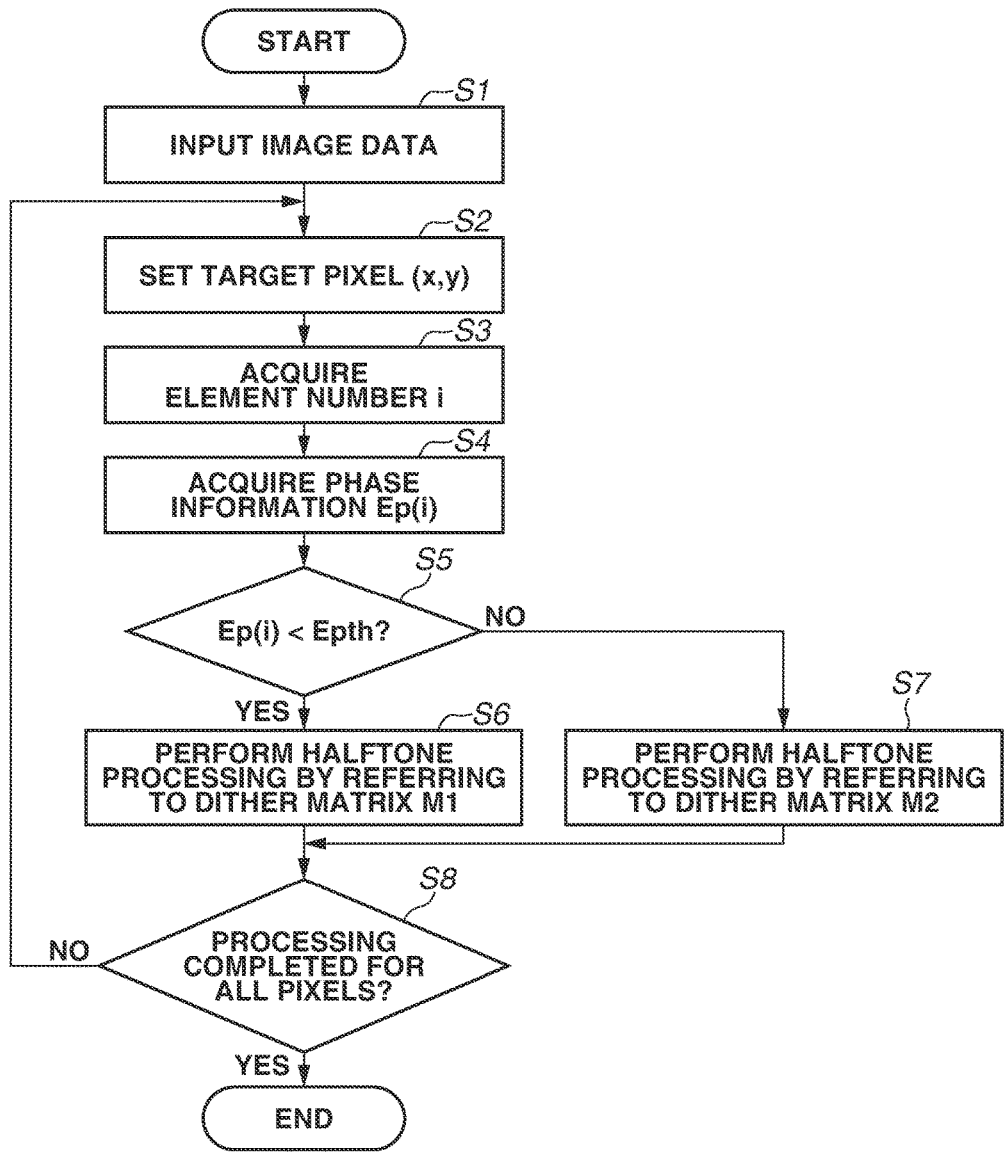
FIG. 15 is a flowchart illustrating a halftone processing procedure according to the first exemplary embodiment.

FIG. 15 is a flowchart illustrating an example halftone processing procedure performed by the halftone processing unit 204 of the image processing apparatus 20. The processing illustrated in FIG. 15 is implemented by the CPU 21 reading and executing a program stored in the ROM 22 or the external memory 24.

In step S1, the halftone processing unit 204 receives 8-bit image data from the gamma correction unit 203, and the processing proceeds to step S2.

Figure 16:
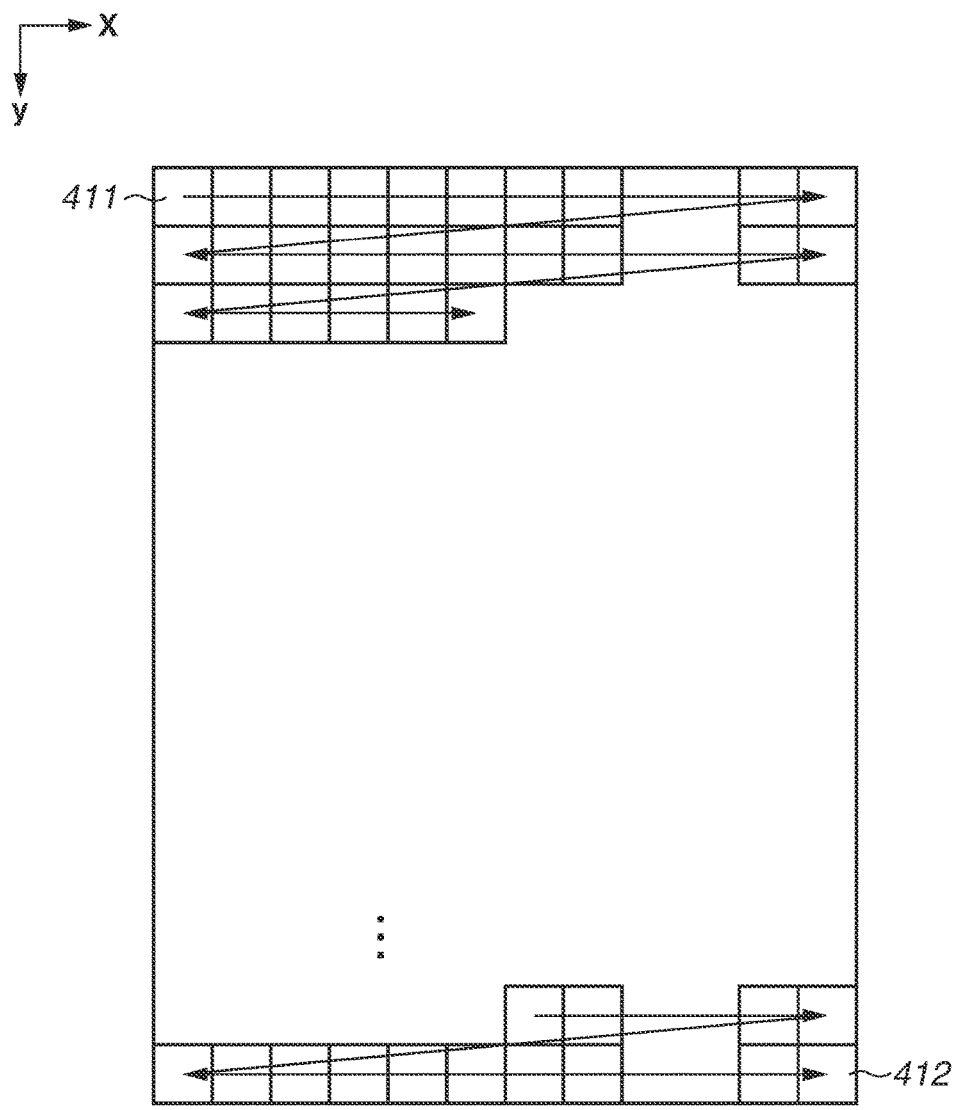
FIG. 16 is a diagram illustrating a method for setting a target pixel position.

In step S2, the halftone processing unit 204 sets a target pixel (x, y) in the input image data. FIG. 16 illustrates a method for setting the position of the target pixel. In the present exemplary embodiment, the halftone processing unit 204 selects processing target pixels one by one from image data configured with a plurality of arranged pixels, in the order indicated by the arrows illustrated in FIG. 16. In FIG. 16, each grid represents one pixel.

The halftone processing unit 204 first selects a pixel 411 located at the upper left corner of the image range as a target pixel. Then, the halftone processing unit 204 changes the target pixel in pixel units in the direction indicated by the arrows illustrated in FIG. 16 (from left to right). When processing is completed for up to the right end of the uppermost column, the halftone processing unit 204 moves the target pixel to the left end pixel of the following pixel column. The halftone unit 204 continues the processing scan in this order as indicated by the arrows illustrated in FIG. 16. When processing is completed for a pixel 412 at the lower right corner as the last pixel, the halftone processing is completed.

Referring back to FIG. 15, in step S3, the halftone processing unit 204 acquires the element number i of the light emitting element corresponding to the target pixel (x, y). For example, the halftone processing unit 204 is able to normally acquire the element number i corresponding to each pixel in the image data from setting information for the document size, the output paper size, and margin space size set as print information. In step S4, the halftone processing unit 204 acquires phase information Ep(i) corresponding to the element number i acquired in step S3 by referring to the spot information illustrated in FIG. 13 acquired by the spot information acquisition unit 206.

In step S5, the halftone processing unit 204 determines whether the phase information Ep(i) acquired in step S4 is smaller than a preset threshold value Epth. The threshold value Epth may be, for example, set as a half interval (0.5) of the lens arrangement interval.

When the phase information Ep(i) is smaller than the threshold value Epth (=0.5) (YES in step S5), the processing proceeds to step S6. On the other hand, when the phase information Ep(i) is equal to or larger than the threshold value Epth (=0.5) (NO in step S5), the processing proceeds to step S7.

In step S6, the halftone processing unit 204 outputs the output image signal Out of the target pixel (x, y) by referring to the first dither matrix M1 illustrated in FIG. 9 acquired by the dither matrix acquisition unit 205. The halftone processing unit 204 compares the gradation value In of the target pixel (x, y) with the threshold value group T corresponding to the first dither matrix M1, and outputs the associated output image signal Out as the gradation value of halftone dots.

In step S7, the halftone processing unit 204 outputs the output image signal Out of the target pixel (x, y) by referring to the second dither matrix M2 illustrated in FIG. 10 acquired by the dither matrix acquisition unit 205. Similar to step S6, in step S7, the halftone processing unit 204 compares the gradation value In of the target pixel (x, y) with the threshold value group T corresponding to the second dither matrix M2, and outputs the associated output image signal Out as the gradation value of halftone dots.

In step S8, the halftone processing unit 204 determines whether the processing in steps S2 to S7 is completed for all pixels in the input image. More specifically, the halftone processing unit 204 determines whether the target pixel (x, y) set in step S2 has reached the last pixel 412 illustrated in FIG. 16. When the target pixel (x, y) has not reached the last pixel (NO in step S8), the processing returns to step S2. On the other hand, when the target pixel (x, y) has reached the last pixel 412 (YES in step S8), the halftone processing is ended.

With this halftone processing, the image processing apparatus 20 is able to alternately select the first and the second dither matrices and generate image data at intervals of a half of the interval p2. Thus, the image forming apparatus 30 is able to form a high definition image in which density nonuniformity is favorably restrained.

In the image forming apparatus 30, since it is difficult to reduce the size of the lenses configuring the exposure unit 313 to about the pixel pitch, and each lens is shared by a plurality of LED elements. More specifically, the lens arrangement interval (lens pitch) is different from the LED element arrangement interval, and the relative positional relationship between the LED elements and the lenses differs for each LED element. Therefore, the spot areas formed by the light emitted from the LED elements condensed by the lenses are distorted in shape in different directions according to the positional relationship between the optical axis of each LED element and the optical axis of each lens.

In the present exemplary embodiment, the image processing apparatus 20 performs halftone processing by using a dither matrix according to the relative positional relationship between the LED elements (light emitting elements) and the lenses. Therefore, it is possible to suitably restrain periodical density nonuniformity of the output image occurring because the spot areas are distorted in shape in different directions. In this case, the image processing apparatus 20 only needs to change the dither matrix to be used for the halftone processing, and hence enables forming a high definition image in a comparatively easy way without requiring complicated processing.

In the halftone processing, the image processing apparatus 20 selects either one of the first and the second dither matrices in a mirror image relationship with each other. More specifically, one of the two dither matrices is a reflection of the other with respect to either the x direction corresponding to the lens arrangement direction or the y direction orthogonal to the x direction as an axis of reflection. In this way, by focusing on the fact that the spot shape inclination due to defocusing is symmetrically repeated in the x or y direction, the image processing apparatus 20 generates a screen so that the halftone dot shapes become symmetrical with respect to the x or y direction according to the spot shape inclination (lens phase). This enables suitably providing a uniform image density without requiring complicated processing.

Further, the image processing apparatus 20 sets each halftone dot pattern so that the amount of shift between the centroid position of the first halftone dot pattern and the centroid position of the second halftone dot pattern is within a predetermined range, i.e., these two centroids are at approximately the same positions. Therefore, the image forming apparatus 30 is able to form an image in which density nonuniformity due to the halftone dot centroid is restrained. Halftone dots in the second halftone dot pattern are set in a mirror image relationship with the halftone dots in the first halftone dot pattern at least in gradations in which each halftone dot pattern is isolated. In this way, the second halftone dot pattern is configured of the halftone dots in a mirror image relationship with the halftone dots of the first halftone dot pattern only in gradations at highlighted portions. This enables, when a dither matrix having a complicated shape is used, restraining toner adhesion from becoming unstable due to the use of mirror image patterns in gradations denser than the intermediate gradation.

In the halftone processing, the image processing apparatus 20 alternately selects the first and the second dither matrices at intervals of a half of the interval p2. In this way, the image processing apparatus 20 is able to suitably select a dither matrix by utilizing the fact that the spot shape inclination due to defocusing is repeated at p2/2 intervals. Accordingly, the image forming apparatus 30 is able to form a high-definition image in which density nonuniformity is favorably restrained.

Further, in the halftone processing, the image processing apparatus 20 selects either one of the first and the second dither matrices whichever enables generating halftone dots having more lighting contour pixels obliquely adjacent in the same oblique direction as the arrangement direction of a plurality of the lenses that allow passage mainly of the light emitted from each LED element. In this way, the image forming apparatus 30 is able to irradiate the spot areas in a mutually overlapped manner, making it possible to form stable halftone dots.

Next, a second exemplary embodiment of the present disclosure will be described. In the above-described first exemplary embodiment, the image processing apparatus 20 selects a dither matrix to be used in the halftone processing according to the pre-stored phase information Ep(i) of the lenses for each light emitting element. The second exemplary embodiment will be described below centering on a method for selecting the above-described dither matrix in consideration of the temporally changing defocus amount between the photosensitive drum surface and the lens image-forming surface.

The defocus amount between the photosensitive drum surface and the lens image-forming surface may change according to variations of the optical system due to the heat generation in the exposure unit and the eccentricity of the photosensitive drum. More specifically, the blur amount W (distortion amount) of the spot area may change with variation in the defocus amount. Further, the distortion direction θ of the spot area may also change for the same reason. Therefore, when the phase information Ep(i) of the lenses for each light emitting element, i.e., the dither matrix to be used for halftone processing is selected based only on the pre-stored distortion direction θ of the spot area, density nonuniformity may not be suitably restrained.

Accordingly, in the present exemplary embodiment, in consideration of the fact that the spot area temporally changes in shape, the distortion direction θ and the blur amount W of the spot area are measured as spot information, and a dither matrix to be used for halftone processing is selected based on the result of the measurement. In the present exemplary embodiment, two test image patterns having different halftone dot patterns are formed, and the distortion direction θ and the blur amount W of the spot area are derived based on the output result of these two test image patterns.

Figure 17:
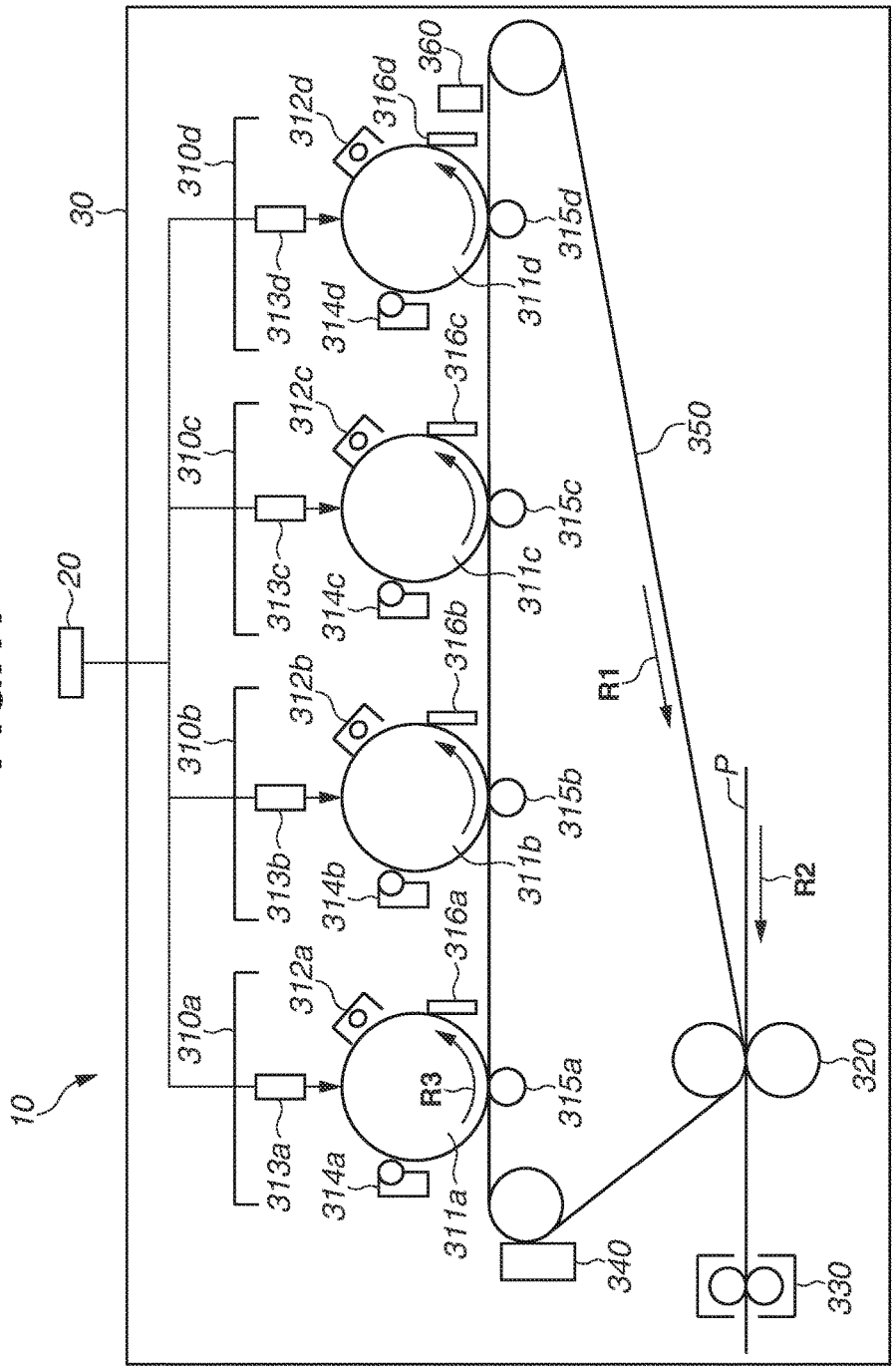
FIG. 17 is a diagram illustrating an example configuration of an image forming system according to a second exemplary embodiment.

FIG. 17 illustrates an example configuration of the image forming system 10 according to the second exemplary embodiment. In FIG. 17, components having similar configurations to those of the image forming system 10 according to the above-described first exemplary embodiment are assigned the same reference numerals as in FIG. 1, and the following descriptions will be made centering on components having different configurations. The image forming apparatus 30 includes a density detection unit 360 for detecting the density of the image pattern primarily transferred onto the intermediate transfer belt 350. The density detection unit 360 is disposed between the image forming unit (the image forming unit 310d illustrated in FIG. 17) on the most downstream side in the moving direction of the intermediate transfer belt 350 and the secondary transfer unit 320. The image pattern passes through a density detectable area by the density detection unit 360 with the movement of the intermediate transfer belt 350. The density detection unit 360 detects the density of the image pattern passing through the density detectable area. The density detection unit 360 includes a plurality of image sensors each being arranged along the longitudinal direction of the photosensitive drum (X-axis direction).

In the present exemplary embodiment, the image forming apparatus 30 forms a test image pattern under two different halftone dot pattern conditions. The image processing apparatus 20 measures the spot information (the distortion direction $\theta$ and the blur amount W of the spot areas) based on the density difference. More specifically, the image processing apparatus 20 controls the image forming apparatus 30 to form two different test image patterns, and the density detection unit 360 detects respective image densities. The image processing apparatus 20 calculates the difference in the output density of the density detection unit 360, and measures the spot information based on the density difference.

The image processing apparatus 20 may periodically measure the spot information or irregularly measure it by using, as a trigger, no input state of the input image data having continued for a predetermined period from an external apparatus to the image input unit 201. Further, the operator may specify a timing of measuring the spot information.

Figure 18:
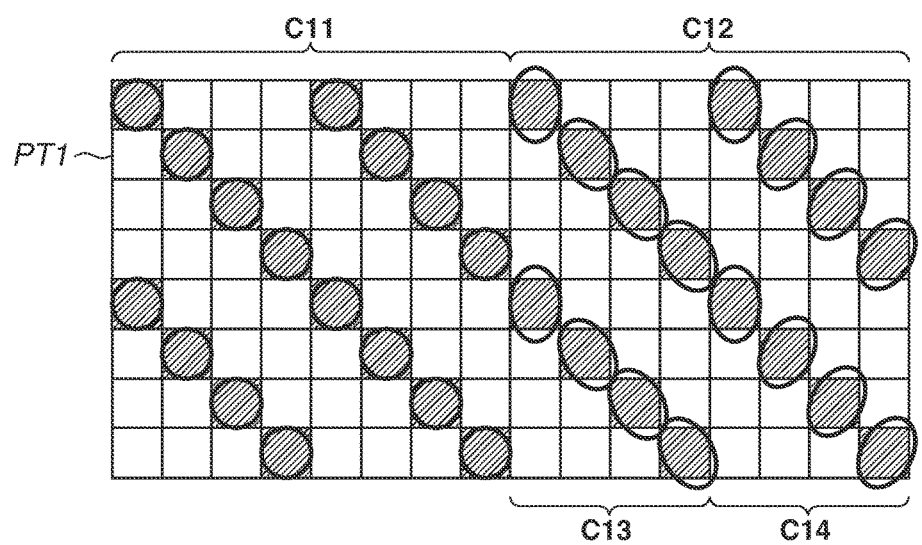
FIG. 18 is a diagram illustrating an example of a first test image pattern.
Figure 19:
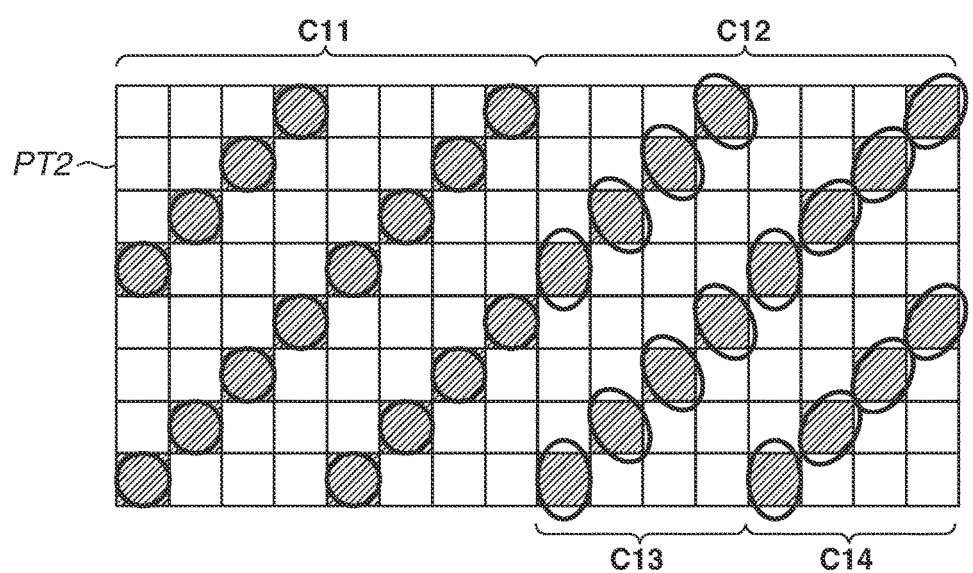
FIG. 19 is a diagram illustrating an example of a second test image pattern.

FIG. 18 illustrates an example of a first test image pattern PT1. FIG. 19 illustrates an example of a second test image pattern PT2. Referring to FIGS. 18 and 19, each spot area having a circular or an elliptical shape is illustrated in an overlapped manner on each dot of the respective test image patterns. FIGS. 18 and 19 illustrate that defocusing does not occur in the area of a pixel column C11, and that defocusing occurs in the area of a pixel column C12.

As illustrated in FIGS. 18 and 19, the test image data is halftone dot image data of a line screen having more lighting contour pixels obliquely adjacent. This makes it easier to detect density variations in the test image due to the distortion directions of the spot areas. The test image patterns are not limited thereto, and may be arbitrarily set.

In an area having a large blur amount W in the spot areas, the ease of toner adhesion changes according to the distortion directions of the spot areas and the characteristics of the halftone dot patterns. More specifically, the number of lighting contour pixels obliquely adjacent in approximately the same oblique direction as the distortion direction of the spot area changes. Therefore, the output image includes areas having high densities and areas having low densities. On the other hand, in an area having a small blur amount W in the spot areas, the change in ease of toner adhesion is small, and hence the variation in density is small.

FIG. 18 illustrates a case where the first test image pattern PT1 is formed. In the area of a pixel column C13 in the area of a pixel column C12, there are many lighting contour pixels obliquely adjacent in approximately the same oblique direction as the distortion directions of the spot areas. In the area of a pixel column C14 in the area of the pixel column C12, there are no lighting contour pixels obliquely adjacent in approximately the same oblique direction as the distortion directions of the spot areas. Accordingly, the output image provides a high density in the area of the pixel column C13 having comparatively a large blur amount W in the spot areas, and provides a low density in the area of the pixel column C14.

FIG. 19 illustrates a case where the second test image pattern PT2 is formed. In the area of the pixel column C14 in the area of the pixel column C12, there are many lighting contour pixels obliquely adjacent in approximately the same oblique direction as the distortion directions of the spot areas. In the area of the pixel column C13 in the area of the pixel column C12, there are no lighting contour pixels obliquely adjacent in approximately the same oblique direction as the distortion directions of the spot areas. Accordingly, in FIG. 19, the output image provides a high density in the area of the pixel column C13, and provides a low density in the area of the pixel column C14. Therefore, information about spot areas can be acquired based on density variations in the test images in which the test image pattern PT1 and PT2 are formed.

Figure 20:
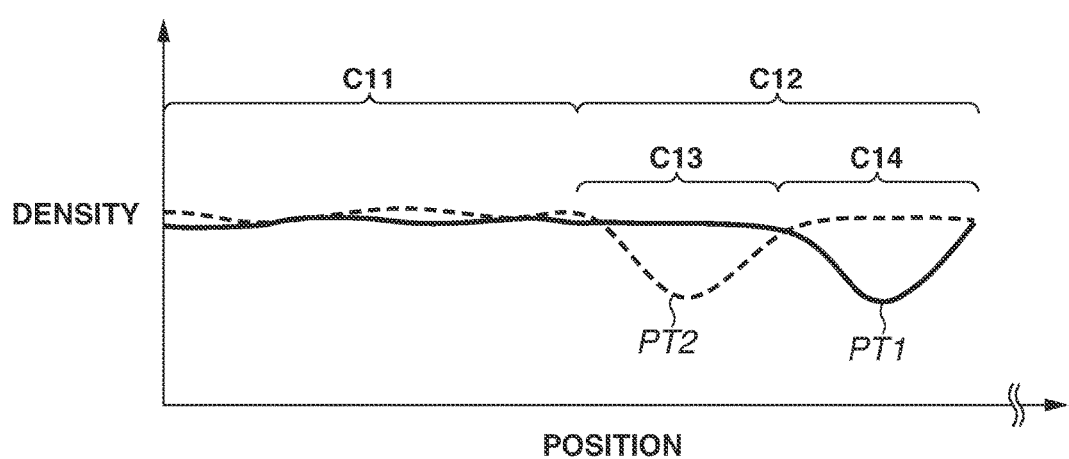
FIG. 20 is a graph illustrating examples of measured densities of test image patterns.

FIG. 20 illustrates examples of densities of the two test image patterns detected by the density detection unit 360. FIG. 20 illustrate the densities of the two test image patterns in a case where the distortion direction $\theta$ and the blur amount W of the spot areas are as illustrated in FIGS. 18 and 19, respectively. Referring to FIG. 20, the horizontal axis is assigned the position of the image sensors arranged along the X-axis direction, and the vertical axis is assigned the average brightness of the test image patterns in the Y-axis direction detected by the respective image sensors.

In FIG. 20, the solid line indicates the detected density of the first test image pattern PT1, and the dashed line indicates the detected density of the second test image pattern PT2. Thus, when the distortion direction $\theta$ and the blur amount W of the spot areas are as illustrated in FIGS. 18 and 19, the area of the pixel column C11 provides a small difference (density difference) between the image density of the first test image pattern PT1 and the image density of the second test image pattern PT2. On the other hand, when the distortion direction $\theta$ and the blur amount W of the spot areas are as illustrated in FIGS. 18 and 19, the area of the pixel column C12 provides a large difference between the image densities. More specifically, by calculating the density difference between the two test image patterns based on the image density detected by the density detection unit 360, the image processing apparatus 20 is able to distinguish between an area having a small blur amount in the spot areas and an area having a large blur amount in the spot areas. In this case, the image processing apparatus 20 is able to estimate an area having a small density difference as an area having a small blur amount in the spot areas, and to estimate an area having a large density difference as an area having a large blur amount in the spot areas. In this manner, the image processing apparatus 20 is able to acquire the blur amounts W of the spot areas based on the difference between the output density of the test image pattern PT1 and the output density of the test image pattern PT2.

Further, as illustrated in FIG. 20, in an area where the image density of the test image pattern PT1 is higher than the image density of the test image pattern PT2 (e.g., in the area of the pixel column C13), the image processing apparatus 20 is able to estimate that the distortion direction is the direction A. Further, in an area where the image density of the test image pattern PT2 is higher than the image density of the test image pattern PT1 (e.g., in the area of the pixel column C14), the image processing apparatus 20 is able to estimate that the distortion direction is the direction B. In this way, the image processing apparatus 20 is able to acquire the distortion direction θ of the spot area based on output density variations in the test image patterns.

<Image Processing Apparatus 20>

Figure 21:
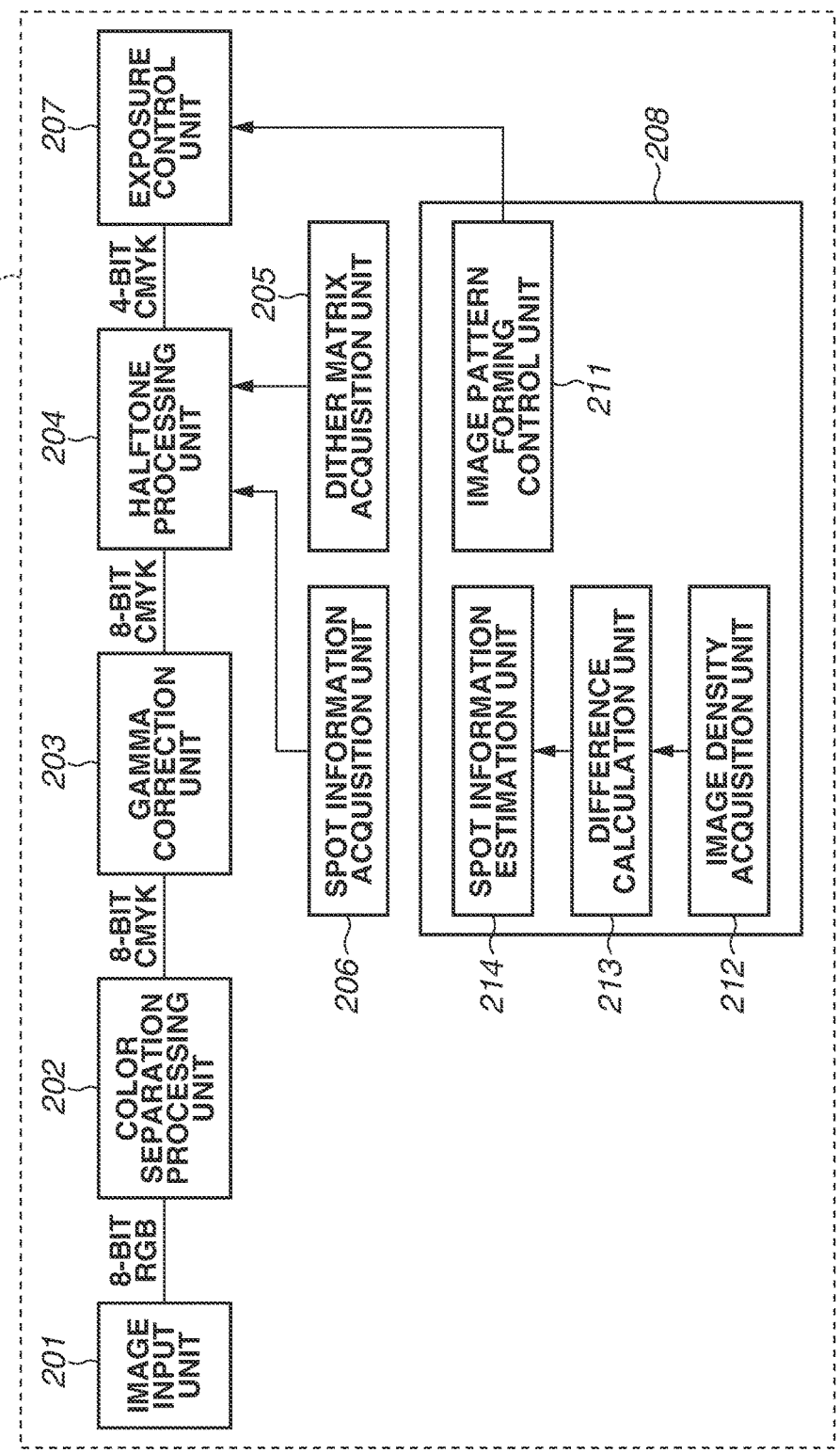
FIG. 21 is a block diagram illustrating an example configuration of an image processing apparatus according to the second exemplary embodiment.

FIG. 21 is a block diagram illustrating an example configuration of the image processing apparatus 20 according to the second exemplary embodiment. In FIG. 21, components having similar configurations to those of the image processing apparatus 20 according to the above-described first exemplary embodiment are assigned the same reference numerals as in FIG. 8, and the following descriptions will be made centering on components having different configurations. The image processing apparatus 20 according to the present exemplary embodiment includes a spot information measurement unit 208 for measuring spot information. The spot information measurement unit 208 includes an image pattern forming control unit 211, an image density acquisition unit 212, a difference calculation unit 213, and a spot information estimation unit 214.

The image pattern forming control unit 211 outputs test image data for forming the first test image pattern PT1 and the second test image pattern PT2 to the exposure control unit 207. The image density acquisition unit 212 acquires the image density of the first test image pattern PT1 and the image density of the second test image pattern PT2 detected by the density detection unit 360, and outputs these image densities to the difference calculation unit 213.

The difference calculation unit 213 calculates the difference between the image density of the first test image pattern PT1 and the image density of the second test image pattern PT2, and outputs the result of the calculation to the spot information estimation unit 214. The spot information estimation unit 214 estimates spot information (the distortion direction θ and blur amount W of the spot area) based on the density difference calculated by the difference calculation unit 213, and stores the estimated spot information in the spot information storage unit. In this way, the spot information acquisition unit 206 is able to acquire the spot information estimated by the spot information estimation unit 214 from the spot information storage unit.

<Spot Information Measurement Processing Procedure in Image Processing Apparatus 20>

Figure 22:
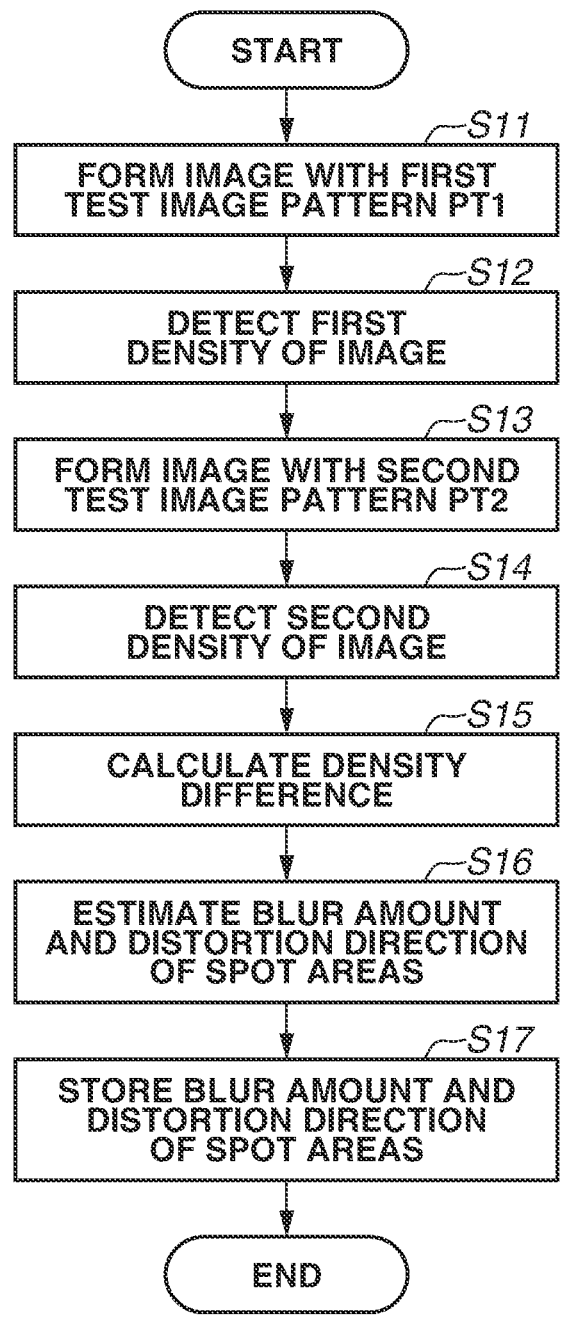
FIG. 22 is a flowchart illustrating a spot information measurement processing procedure.

FIG. 22 is a flowchart illustrating an example of a spot information measurement processing procedure performed by the spot information measurement unit 208 of the image processing apparatus 20. The processing illustrated in FIG. 22 is implemented by the CPU 21 illustrated in FIG. 14 reading and executing a program stored in the ROM 22 or the external memory 24.

This spot information measurement processing is performed for each of the image forming units 310a to 310d for CMYK colors. When the semiconductor laser element group 301 includes a plurality of semiconductor laser elements, the image processing apparatus 20 performs the spot information measurement processing on all of the semiconductor laser elements.

In step S11, the spot information measurement unit 208 forms an image of the first test image pattern PT1. More specifically, the image pattern forming control unit 211 outputs first test image data to the exposure control unit 207. Thus, the exposure control unit 207 controls the processing target exposure unit out of the exposure units 313a to 313d to form a first test image corresponding to the first test image pattern PT1 on the surface of the photosensitive drum 311. The first test image formed on the surface of the photosensitive drum 311 is transferred onto the intermediate transfer belt 350.

In step S12, the spot information measurement unit 208 detects, for each pixel, the density (first density) of the image formed with the first test image pattern PT1 detected by the density detection unit 360, and the processing proceeds to step S13.

In step S13, the spot information measurement unit 208 forms an image with the second test image pattern PT2. More specifically, the image pattern forming control unit 211 outputs the second test image data to the exposure control unit 207. Thus, the exposure control unit 207 controls the processing target exposure unit out of the exposure units 313a to 313d to form a second test image corresponding to the second test image pattern PT2 on the surface of the photosensitive drum 311. The second test image formed on the surface of the photosensitive drum 311 is transferred onto the intermediate transfer belt 350.

In step S14, the spot information measurement unit 208 detects, for each pixel, the density (second density) of the image formed with the second test image pattern PT2 detected by the density detection unit 360, and the processing proceeds to step S15.

In step S15, the spot information measurement unit 208 calculates, for each pixel, the difference (density difference) between the first density acquired in step S12 and the second density acquired in step S14, and the processing proceeds to step S16. In step S16, the spot information measurement unit 208 estimates the blur amount W and the distortion direction θ of the spot area based on the density difference calculated in step S15. For example, referring to a prepared table, the spot information measurement unit 208 estimates the blur amount W and the distortion direction θ of the spot area based on the above-described density difference.

FIG. 23 illustrates an example of a table used to estimate the spot information. In this way, the spot information can be acquired by referring to the table associating the density difference with the spot information. In this case, for example, when the density difference calculated in step S15 is 0.2, the spot information measurement unit 208 estimates that the blur amount W of spots is 20% and that the distortion direction θ is the direction A by referring to the table illustrated in FIG. 23. When the table does not store the spot information corresponding to the density difference calculated in step S15, the spot information measurement unit 208 may interpolate the stored information (by using a common method such as linear interpolation) to acquire the spot information.

In step S17, the spot information measurement unit 208 stores the distortion direction θ and the blur amount W of the spot area estimated in step S16 in the spot information storage unit, and ends the spot information measurement processing. FIG. 24 illustrates an example of the distortion direction θ and the blur amount W of the spot area corresponding to each light emitting element stored in the spot information storage unit. In this way, the spot information corresponding to the element number i is stored in the spot information storage unit. With the above-described processing, the image processing apparatus 20 is able to measure the blur amount W and the distortion direction θ of the spot area for each of the image forming units 310a to 310d as required.

(Halftone Processing Procedure in Image Processing Apparatus 20)

Figure 25:
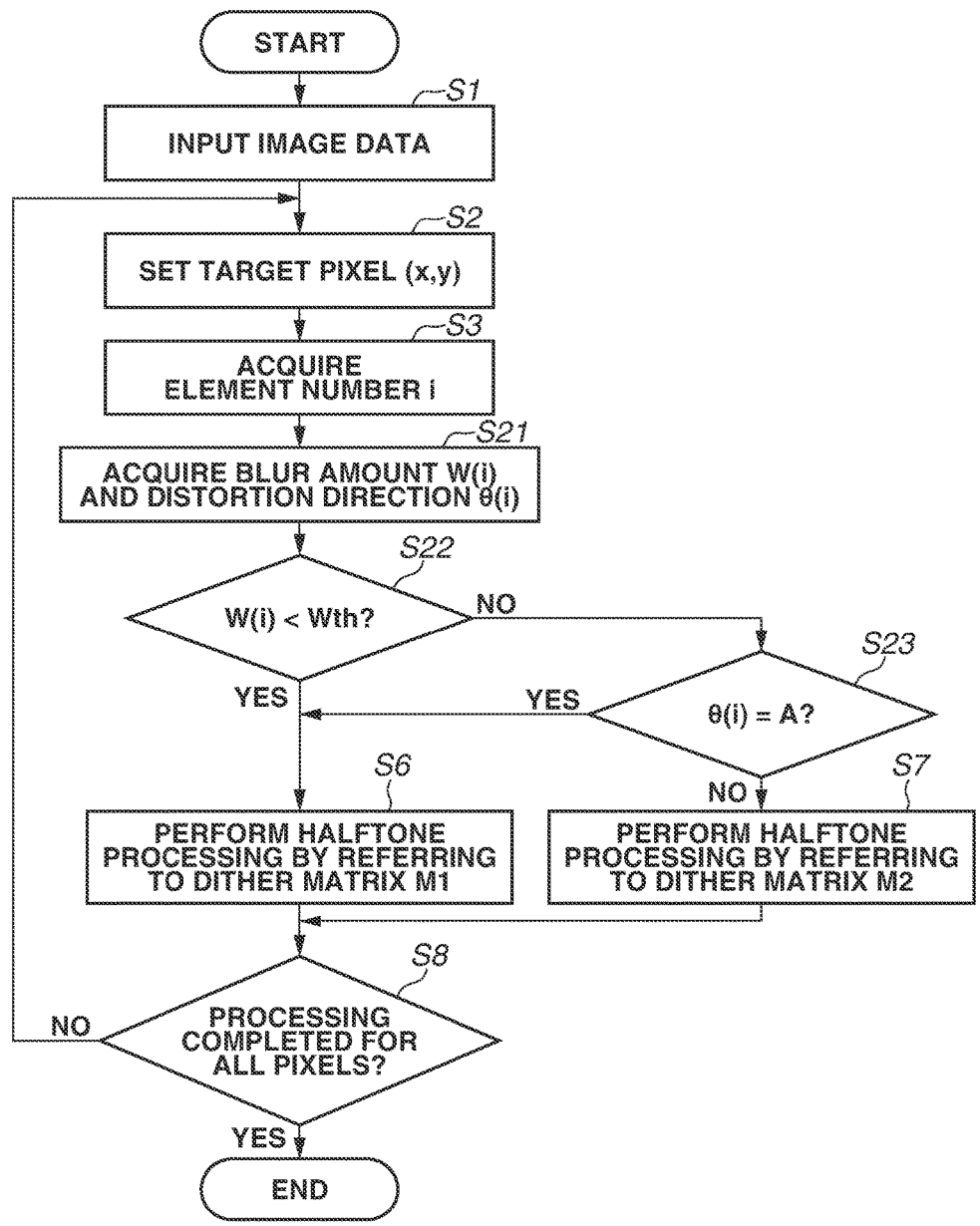
FIG. 25 is a flowchart illustrating a halftone processing procedure according to the second exemplary embodiment.

FIG. 25 is a flowchart illustrating an example of a halftone processing procedure performed by the halftone processing unit 204 of the image processing apparatus 20. The processing illustrated in FIG. 25 is implemented by the CPU 21 illustrated in FIG. 14 reading and executing a program stored in the ROM 22 or the external memory 24. The halftone processing illustrated in FIG. 25 is the same as the processing illustrated in FIG. 15 except that steps S4 and S5 in the halftone processing according to the first exemplary embodiment illustrated in FIG. 15 is replaced with steps S21 to S23. Therefore, the following descriptions will be made centering on different portions.

In step S21, the halftone processing unit 204 refers to the spot information illustrated in FIG. 24 acquired by the spot information acquisition unit 206, and acquires the distortion direction θ(i) and the blur amount W(i) of the spot area corresponding to the element number i acquired in step S3.

In step S22, the halftone processing unit 204 determines whether the blur amount W(i) acquired in step S21 is smaller than a preset threshold value Dth. In this case, a threshold value Wth may be, for example, a permissible value of the blur amount of the spot area. When the blur amount W(i) is smaller than the threshold value Wth (YES in step S22), the processing proceeds to step S6. On the other hand, when the blur amount W(i) is equal to or larger than the threshold value Wth (NO in step S22), the processing proceeds to step S23.

In step S23, the halftone processing unit 204 determines whether the distortion direction θ(i) of the spot area acquired in step S21 is the direction A. When the halftone processing unit 204 determines that the distortion direction θ(i) is the direction A (YES in step S23), the processing proceeds to step S6. On the other hand, when the halftone processing unit 204 determines that the distortion direction θ(i) is the direction B (NO in step S23), the processing proceeds to step S7. As described above, the halftone processing unit 204 performs halftone processing according to the distortion direction θ and the blur amount W of the spot area.

As described above, in the present exemplary embodiment, the image processing apparatus 20 first measures the information about the spot areas formed when the light emitted from the LED elements is condensed by lenses. Then, the image processing apparatus 20 performs halftone processing based on the result of the measurement. This enables suitably restraining density nonuniformity also for the temporally changing defocus amount. In this case, since the distortion direction and the distortion amount (blur amount) of the spot area are acquired as information about the spot area, the influence of distortion of the spot areas can be suitably restrained.

When the blur amount of the spot area is smaller than an allowable threshold value, the influence on density nonuniformity due to the distortion direction of the spot area is small. In this case, therefore, the image processing apparatus 20 performs halftone processing by using the first dither matrix regardless of the distortion direction. In this way, the image processing apparatus 20 is able to form a favorable image in which texture differences resulting from the use of different dither matrices are restrained.

On the other hand, when the blur amount is equal to or larger than the allowable threshold value, the image processing apparatus 20 selects a dither matrix according to the distortion direction, and performs halftone processing. More specifically, the image processing apparatus 20 selects either one of the first and the second dither matrices whichever enables generating a halftone dot pattern having more lighting contour pixels obliquely adjacent in the same oblique direction as the distortion direction, and performs halftone processing. Therefore, the image forming apparatus 30 is able to form a high-definition image in which density nonuniformity is favorably restrained.

The image processing apparatus 20 is further able to acquire the spot information based on the density difference between the first and the second test images formed by using the first and the second test image data, respectively, thus acquiring the spot information in a comparatively easy way without requiring complicated processing. Further, the test image data is halftone dot image data of a line screen oblique to the x direction. In this way, by using halftone dot image data of a line screen having more lighting contour pixels obliquely adjacent as test image data, the image processing apparatus 20 is able to easily detect density variations due to the distortion directions of the spot areas.

In the image forming apparatus 30, a positional shift (defocusing) in the optical axis direction may occur on the surface of the photosensitive drum and the lens image-forming surface because of a manufacturing error and an assembly error of components and supporting members. If the defocus amount differs for each light emitting element, the blur amount of each spot area will be different. In the present exemplary embodiment, the image processing apparatus 20 acquires the distortion direction and the distortion amount (blur amount) of the spot area as the information about the spot area, and selects a dither matrix to be used for halftone processing based on the information about the acquired spot areas, as the spot information. As a result, the above-described influence of distortion of the spot areas can also be suitably restrained.

Although, in the above-described exemplary embodiment, the image processing apparatus 20 acquires the spot information based on the density difference between the first and the second test images, the image processing apparatus 20 may acquire the spot information based on the density variations in either one of the test images. For example, the example illustrated in FIG. 20 is based on density variations in the first test image pattern PT1 drawn with a solid line. At least in the area of the pixel column C14 having a relatively low image density, it is estimated that distortion of the spot area occurs and that the distortion direction is the direction B. In this way, the distortion direction θ of the spot area can be acquired based on output density variations in one test image pattern. Although, in the above-described exemplary embodiment, the spot information is acquired by using two different test image patterns, three or more different test image patterns may be used.

Next, a third exemplary embodiment of the present disclosure will be described. In the first and the second exemplary embodiments described above, the image processing apparatus 20 selects either one of two dither matrices corresponding to two halftone dot patterns according to the distortion directions of the spot areas S. The third exemplary embodiment will be described below centering on a method in which the image processing apparatus 20 selects one of three or more dither matrices corresponding to three or more halftone dot patterns according to the distortion directions of the spot areas S.

Figure 26:
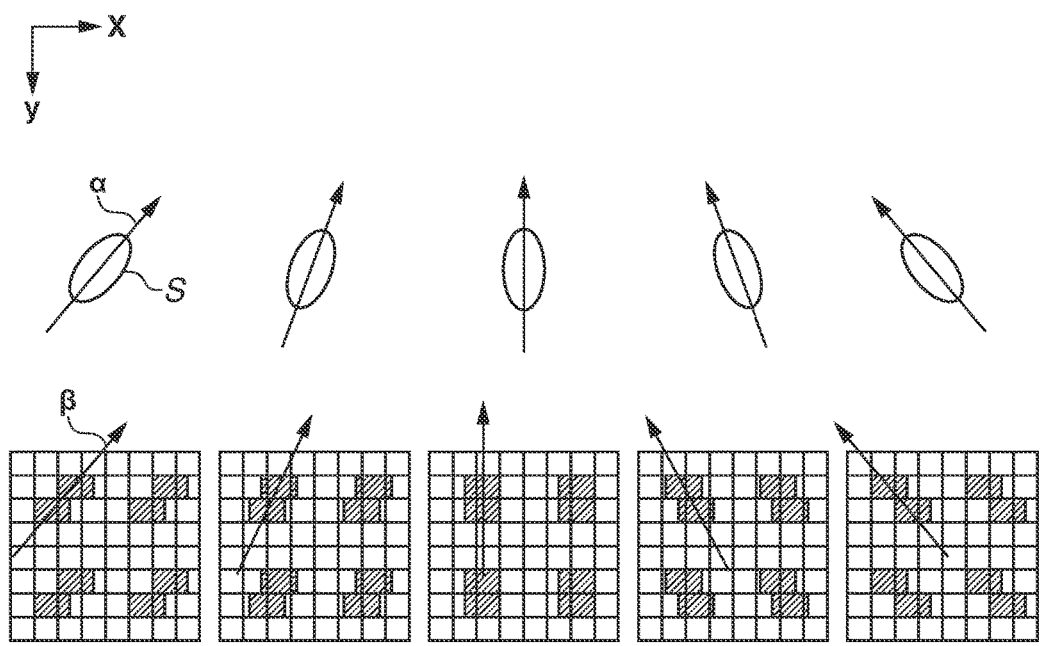
FIG. 26 is a diagram illustrating halftone dot patterns and spot shapes according to a third exemplary embodiment.

FIG. 26 illustrates examples of five different halftone dot patterns selected according to a distortion direction α of each spot area S. Referring to FIG. 26, the bottom row illustrates halftone dot patterns corresponding to the distortion direction α of the spot area S illustrated in the top row, one grid corresponds to one pixel, and shaded portions represent lighting pixels. When the distortion direction α of the spot area S continuously changes in the X-axis direction, the image processing apparatus 20 selects a dither matrix corresponding to the halftone dot pattern according to the distortion direction α of the spot area S out of a plurality of halftone dot patterns (five patterns illustrated in FIG. 26) having different adjacent arrangement direction β. More specifically, the image processing apparatus 20 selects such a dither matrix that reduces the difference between the adjacent arrangement direction β of a halftone dot pattern and the distortion direction α of the spot area S (i.e., the difference becomes equal to or smaller than a fixed value). In this case, the adjacent arrangement direction β of a halftone dot pattern is a direction in which lighting contour pixels configuring halftone tones are adjacent. Then, the image processing apparatus 20 performs halftone processing by using the selected dither matrix. The dot shape is controlled in a unit smaller than the pixel size in the example illustrated in FIG. 26. This control can be achieved through what is called pulse width modulation (PWM) control.

<Halftone Processing Procedures in Image Processing Apparatus 20>

Figure 27:
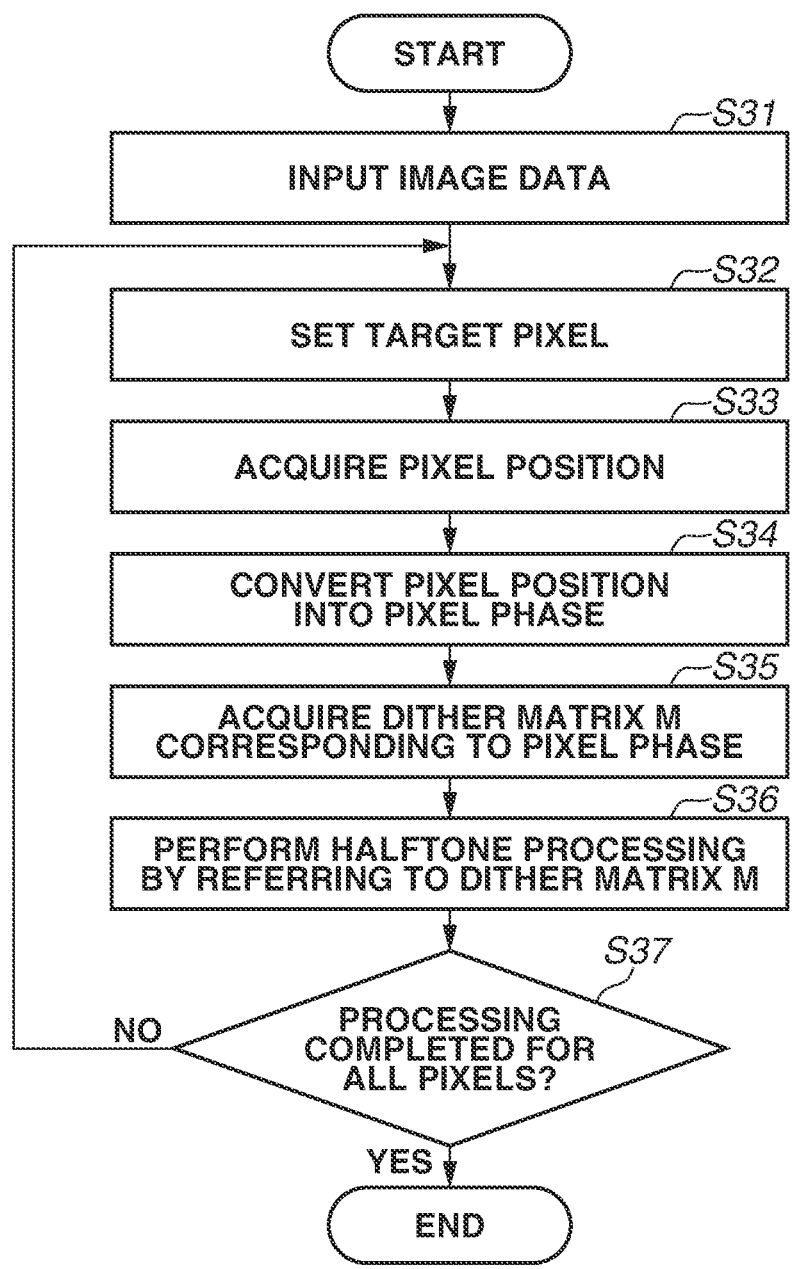
FIG. 27 is a flowchart illustrating a halftone processing procedure according to the third exemplary embodiment.

The image processing apparatus 20 according to the present exemplary embodiment has the configuration illustrated in FIG. 8 from which the spot information acquisition unit 206 is excluded. FIG. 27 is a flowchart illustrating an example of a halftone processing procedure performed by the halftone processing unit 204 of the image processing apparatus 20. The processing illustrated in FIG. 27 is implemented by the CPU 21 illustrated in FIG. 14 reading and executing a program stored in the ROM 22 or the external memory 24.

In step S31, the halftone processing unit 204 receives 8-bit image data from the gamma correction unit 203, and the processing proceeds to step S32. In step S32, the halftone processing unit 204 sets a target pixel in the input image data by using a similar method to that in step S2 illustrated in FIG. 15.

In step S33, the halftone processing unit 204 acquires an X-axis directional pixel position x (hereinafter also simply referred to as a "pixel position x") indicating information about the position of the target pixel in the X-axis direction. FIG. 28 illustrates examples of pixel positions of pixels. In FIG. 28, one grid indicates one pixel, and the numbers in each grid represent the pixel position (x, y) of each pixel. In this case, a first element x of the pixel position (x, y) is the X-axis directional pixel position, and a second element y thereof is a Y-axis directional pixel position. The Y-axis directional pixel position y (hereinafter also simply referred to as a "pixel position y") indicates information about the position of the target pixel in the Y-axis direction. As illustrated in FIG. 28, pixels having the same X-axis directional pixel position (i.e., pixels adjacent in the Y-axis direction) have the same pixel position x.

Figure 29:
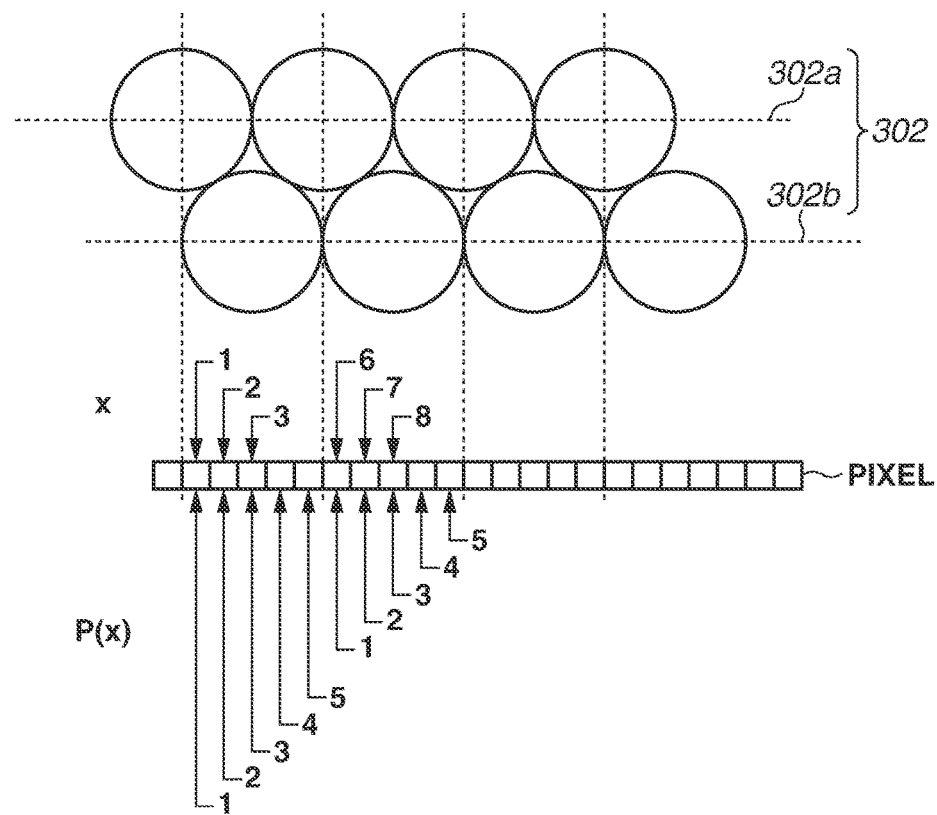
FIG. 29 is a schematic diagram illustrating a pixel phase P(x).

In step S34, the halftone processing unit 204 converts the pixel position x acquired in step S33 into a pixel phase P(x). As illustrated in FIG. 29, the pixel phase P(x) is phase information indicating the X-axis directional relative position of each pixel, with respect to each lens configuring the lens group 302. More specifically, in step S34, the halftone processing unit 204 derives the X-axis directional relative position of an LED element corresponding to the target pixel at the pixel position x, relative to the lenses that allow passage mainly of the light emitted from the relevant LED element, as the pixel phase P(x). This means that pixels having the same pixel position x (having the same X-axis directional relative position relative to a lens) have the same pixel phase P(x).

FIG. 30 illustrates an example conversion of the pixel position x illustrated in FIG. 28 into a pixel phase P(x). The conversion from the pixel position x into a pixel phase P(x) may be performed by using a lookup table, a function, or other methods. Although, in the above-described example, the pixel phase P(x) is repeated at intervals of 5 pixels, the pixel phase P(x) is actually repeated at intervals of a larger number of pixels, for example, around 20 pixels.

In step S35, the halftone processing unit 204 acquires a dither matrix M[P(x)] corresponding to the pixel phase P(x) derived in step S34. The dither matrix storage unit stores a plurality of dither matrices (5 dither matrices in the present exemplary embodiment) respectively corresponding to a plurality of pixel phases P(x) (5 pixel phases in the present exemplary embodiment). More specifically, the dither matrix storage unit stores such a dither matrix that reduces the difference between the distortion direction α of the spot area S and the adjacent arrangement direction β of a halftone dot pattern for the pixel phase P(x) (i.e., the difference becomes equal to or smaller than a fixed value) in association with information indicating the pixel phase P(x). In step S35, the halftone processing unit 204 acquires a dither matrix M[P(x)] corresponding to the pixel phase P(x) of the target pixel selected from a plurality of dither matrices in the dither matrix storage unit by the dither matrix acquisition unit 205.

The dither matrix storage unit may store dither matrices corresponding to all of the pixel phases P(x), or store dither matrices corresponding only to a part of the pixel phases P(x). In the latter case, if there is no dither matrix corresponding to the pixel phase P(x) of the target pixel, it is only necessary to select a dither matrix M[p] that enables the pixel phase P(x) of the target pixel to be closest to p.

In step S36, the halftone processing unit 204 outputs the output image signal Out of the target pixel (x, y) by referring to the dither matrix M[P(x)] acquired in step S35. In step S36, similar to above-described steps S6 and S7 illustrated in FIG. 15, the halftone processing unit 204 compares the gradation value In of the target pixel (x, y) with the threshold value group T corresponding to the dither matrix M[P(x)], and outputs the associated output image signal Out as the gradation value of halftone dots.

In step S37, the halftone processing unit 204 determines whether the processing in steps S32 to S36 is completed for all pixels in the input image. More specifically, the halftone processing unit 204 determines whether the target pixel (x, y) set in step S32 has reached the last pixel 412 illustrated in FIG. 16. When the processing is not completed for all pixels (NO in step S37), the processing returns to step S32. On the other hand, when the processing is completed for all pixels (YES in step S37), the halftone processing ends.

With this halftone processing, the image processing apparatus 20 is able to select one of three or more dither matrices corresponding to different halftone dot patterns according to the distortion direction α of the spot area S, and generate image data.

<Effects of Third Exemplary Embodiment>

As described above, in the present exemplary embodiment, the image processing apparatus 20 stores three or more dither matrices corresponding to different halftone dot patterns. Further, based on the pixel position x, which is the position information of the target pixel, the image processing apparatus 20 derives the pixel phase P(x), which is phase information indicating the X-axis directional relative position of the LED element corresponding to the target pixel, with respect to the lenses that allow passage mainly of the light emitted from the relevant LED element. Then, the image processing apparatus 20 selects as a dither matrix to be used for halftone processing either one of three or more dither matrices corresponding to the pixel phase P(x).

In this case, the image processing apparatus 20 selects a dither matrix corresponding to a halftone dot pattern having more lighting contour pixels obliquely adjacent in a predetermined direction in which the difference between the adjacent arrangement direction β of the halftone dot pattern and the distortion direction α of the spot area S irradiated with the light emitted from the LED element corresponding to the target pixel is smaller than a fixed value. Then, the image processing apparatus 20 uses the selected dither matrix for halftone processing as a dither matrix corresponding to the pixel phase P(x). This enables further reducing the difference between the distortion direction α of the spot area S and the adjacent arrangement direction β of the halftone dot pattern compared with a case where one of two dither matrices corresponding to two halftone dot patterns is selected. As a result, density nonuniformity of the output image can be favorably restrained to a further extent.

In this way, when the exposure processing is performed on the surface of the photosensitive drum using the LED exposure method, density nonuniformity can be suitably restrained even in a case where the spot areas S are distorted in shape in different directions because of different positional relationships between the optical axis of each light emitting element and the optical axis of each lens.

Next, a fourth exemplary embodiment of the present disclosure will be described. In the first to the third exemplary embodiments described above, the exposure processing is performed on the surface of the photosensitive drum using the LED exposure method. In the fourth exemplary embodiment, a case will be described where the exposure processing is performed on the surface of the photosensitive drum using the laser exposure method that uses a plurality of laser elements. Further, similar to the above-described third exemplary embodiment, a method for selecting one of three or more dither matrices according to the distortions direction of the spot areas S will be described. Although, in the present exemplary embodiment, the laser exposure method using two laser elements (laser 1 and laser 2) will be described, the number of laser elements is not limited thereto.

A laser exposure type image forming apparatus includes a light source unit for emitting laser light by using a laser element (semiconductor laser) as a light emitting element, and a deflect and scan unit for deflecting the laser light from the light source unit for scanning by using a polygon mirror. Further, the image forming apparatus includes a plurality of lenses for guiding the laser light from the light source unit to the deflect and scan unit, and focusing the laser light deflected for scanning by the deflect and scan unit on an image bearing member. In the present exemplary embodiment, the light source unit includes a plurality of light emitting elements for emitting optical beams (laser light) to be deflected for scanning in the main scanning direction to irradiate different positions in the sub scanning direction.

<Halftone Processing Procedure in Image Processing Apparatus 20>

The image processing apparatus 20 according to the present exemplary embodiment has the configuration illustrated in FIG. 8 from which the spot information acquisition unit 206 is excluded. The halftone processing unit 204 of the image processing apparatus 20 performs the halftone processing illustrated in FIG. 27. As described above, the processing illustrated in FIG. 27 is implemented by the CPU 21 illustrated in FIG. 14 reading and executing a program stored in the ROM 22 or the external memory 24. However, the halftone processing according to the fourth exemplary embodiment differs from the halftone processing according to the third exemplary embodiment in the contents of the processing in steps S33 to S35 illustrated in FIG. 27. Portions different from the halftone processing according to the third exemplary embodiment will be mainly described below.

In step S33, the halftone processing unit 204 acquires a pixel position (x, y) of the target pixel. An example of the pixel position (x, y) is as illustrated in FIG. 28. As illustrated in FIG. 28, pixels having the same X-axis directional pixel position (i.e., pixels adjacent in the Y-axis direction) have the same pixel position x, and pixels having the same Y-axis directional pixel position (i.e., pixels adjacent in the X-axis direction) have the same pixel position y.

Figure 31:
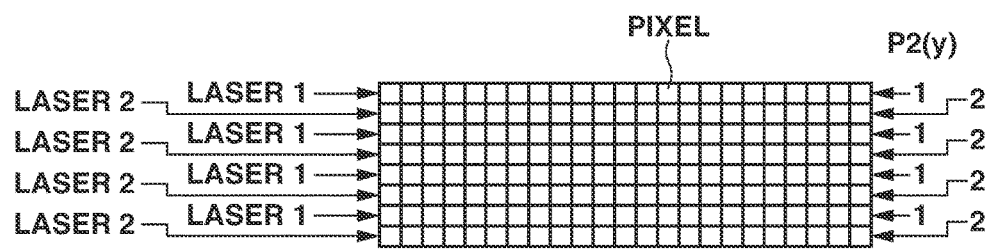
FIG. 31 is a schematic diagram illustrating Y-axis directional pixel phases P2(y).

In step S34, the halftone processing unit 204 converts the pixel position (x, y) acquired in step S33 into a pixel phase P(x, y). The pixel phase P(x, y) is represented by a combination of two elements (P1($x$), P2($y$)). A first element P1($x$) of the pixel phase P(x, y) is the X-axis directional pixel phase indicating the pixel position x. More specifically, the X-axis directional pixel phase P1 is identically transformed. A second element P2($y$) of the pixel phase P(x, y) is the Y-axis directional pixel phase, which is information indicating the laser element for performing the exposure processing corresponding to each pixel, as illustrated in FIG. 31. More specifically, for pixels having the same Y-axis directional position subjected to the exposure processing by the same laser element, the Y-axis directional pixel phase P2($y$) is converted into the same value. In the present exemplary embodiment, the Y-axis directional pixel phase P2($y$) of a pixel subjected to the exposure processing by the laser 1 is set to 1, and the Y-axis directional pixel phase P2($y$) of a pixel subjected to the exposure processing by the laser 2 is set to 2. The Y-axis directional pixel phase P2($y$) may be any information as long as it enables distinguishing the laser element corresponding to the target pixel, and the value of P2($y$) is not limited to 1 or 2.

FIG. 32 illustrates an example conversion of the pixel position (x, y) illustrated in FIG. 28 into a pixel phase P(x, y). The conversion from the pixel position (x, y) into a pixel phase P(x, y) may be performed by using a look-up table, a function, or other methods.

In step S35, the halftone processing unit 204 acquires a dither matrix M[P(x, y)] corresponding to the pixel phase P(x, y) derived in step S34. The dither matrix storage unit stores a plurality of (three or more) dither matrices respectively corresponding to a plurality of (three or more) pixel phases P(x, y). More specifically, the dither matrix storage unit stores such a dither matrix that reduces the difference between the distortion direction α of the spot area S and the adjacent arrangement direction β of a halftone dot pattern for the pixel phase P(x, y) (i.e., the difference becomes equal to or smaller than a fixed value) in association with information indicating the pixel phase P(x, y). In step S35, the halftone processing unit 204 acquires a dither matrix M[P(x, y)] corresponding to the pixel phase P(x, y) of the target pixel selected from a plurality of dither matrices in the dither matrix storage unit by the dither matrix acquisition unit 205.

The dither matrix storage unit may store dither matrices corresponding to all of the pixel phases P(x, y), or store dither matrices corresponding only to a part of the pixel phases P(x, y). In the latter case, if there is no dither matrix corresponding to the pixel phase P(x, y) of the target pixel, it is only necessary to select a dither matrix M[p] that enables the pixel phase P(x, y) of the target pixel to be closest to p.

FIG. 33 illustrates examples of a plurality of dither matrices stored, in association with a plurality of pixel phases P(x, y), in the dither matrix storage unit. FIG. 33 illustrates examples of dither matrices stored in association with a part of the X-axis directional pixel phases P1(x)={128, 256, 384, . . . }. Since the present exemplary embodiment is premised on exposure by two different laser elements, dither matrices are stored in association with two Y-axis directional pixel phases P2(y)={1, 2}. In this case, when the pixel phase P(x, y) is (230, 1), for example, the dither matrix M[256, 1] is selected.

With this halftone processing, the image processing apparatus 20 is able to select one of three or more dither matrices corresponding to different halftone dot patterns according to the distortion directions a of the spot areas S, and generate image data.

As described above, the image forming apparatus 30 according to the present exemplary embodiment performs the exposure processing on the surface of the photosensitive drum using the laser exposure method. In the image forming apparatus 30 employing such a laser exposure method, the spot areas S are distorted in shape in different directions according to the longitudinal direction on the photosensitive drum. When a plurality of light emitting elements irradiates different positions in the sub scanning direction (the rotational direction of the photosensitive drum), the spot areas S may be distorted in shape in different directions according to the laser elements for performing the exposure processing.

In the present exemplary embodiment, the image processing apparatus 20 stores three or more dither matrices corresponding to different halftone dot patterns. Further, the image processing apparatus 20 derives the pixel phase P(x, y) as phase information that is a combination of the pixel phase P1(x) (pixel position x), which is position information of the target pixel, and the pixel phase P2(y), which is information about the laser element corresponding to the target pixel. Then, the image processing apparatus 20 selects either one of three or more dither matrices corresponding to the pixel phase P(x, y) as a dither matrix to be used for halftone processing.

In this case, the image processing apparatus 20 selects a dither matrix corresponding to a halftone dot pattern having more lighting contour pixels obliquely adjacent in a predetermined direction in which the difference between the adjacent arrangement direction β of the halftone dot pattern and the distortion direction α of the spot area S irradiated with the light emitted from the laser element corresponding to the target pixel is smaller than a fixed value. Then, the image processing apparatus 20 uses the selected dither matrix for halftone processing as a dither matrix corresponding to the pixel phase P(x, y).

Therefore, when the exposure processing is performed on the surface of the photosensitive drum using the laser exposure method, density nonuniformity can be suitably restrained even in a case where the spot areas S are distorted in shape in different directions according to the longitudinal direction on the photosensitive drum. This enables further reducing the difference between the distortion direction α of the spot area S and the adjacent arrangement direction β of the halftone dot pattern compared with a case where one of two dither matrices corresponding to two halftone dot patterns is selected. As a result, density nonuniformity of the output image can be favorably restrained to a further extent.

Although, in the above-described exemplary embodiments, LED elements are employed as light emitting elements, laser diodes and organic electroluminescence (EL) elements can also be employed. Although, in the above-described exemplary embodiments, the light emitting elements (LED elements) are arranged in a row as illustrated in FIG. 3, the light emitting elements may be arranged in a plurality of rows (for example, in two rows to form a staggered pattern). Further, the lens group may include lenses arranged in three or more rows.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-001869, filed Jan. 7, 2015, and Japanese Patent Application No. 2015-210178, filed Oct. 26, 2015, which are hereby incorporated by reference herein in their entirety.

What is claimed is:

1. An image processing apparatus configured to generate image data to be used by an image forming apparatus to perform image forming, the image forming apparatus including, a plurality of light emitting elements disposed at first intervals in a first direction, and configured to emit optical beams based on the image data, and a plurality of lenses disposed at second intervals different from the first intervals in the first direction, and configured to focus the light emitted from the plurality of the light emitting elements on an image plane, the image processing apparatus comprising:

a storage device configured to store a plurality of dither matrices respectively corresponding to different halftone dot patterns; and a halftone processor configured to perform halftone processing by using one of the plurality of the dither matrices, wherein the one of the plurality of the dither matrices is selected from the plurality of the dither matrices corresponding to a relative fixed positional difference between a position of each of the plurality of light emitting elements and a position of each of the plurality of lenses to generate the image data.

2. The image processing apparatus according to claim 1, wherein the halftone processor selects either one of a first dither matrix of the plurality of the dither matrices and a second dither matrix of the plurality of the dither matrices as a dither matrix to be used for the halftone processing, the second dither matrix being in a mirror image relationship with the first dither matrix so as to be a reflection of the first dither matrix with respect to an axis corresponding to either one of the first direction and a second direction orthogonal to the first direction as an axis of reflection.

3. The image processing apparatus according to claim 2, wherein a shift amount between a centroid position of a first halftone dot pattern corresponding to the first dither matrix and a centroid position of a second halftone dot pattern corresponding to the second dither matrix is within a predetermined range.

4. The image processing apparatus according to claim 3, wherein, at least in gradations in which each halftone dot pattern is isolated, the second halftone dot pattern is composed of halftone dots in a mirror image relationship with halftone dots in the first halftone dot pattern.

5. The image processing apparatus according to claim 2, wherein the halftone processor performs the halftone processing on a target pixel in a direction corresponding to the first direction by alternately selecting the first and the second dither matrices at intervals of a half of the second interval.

6. The image processing apparatus according to claim 2, wherein a plurality of the lenses is planarly arranged in the first direction and a third direction oblique to the first direction, and
wherein the halftone processor performs the halftone processing by selecting either one of the first and the second dither matrices corresponding to a halftone dot pattern having more lighting contour pixels obliquely adjacent in the same oblique direction as the third direction in which a plurality of the lenses that allow passage mainly of the light emitted from the light emitting elements is arranged.

7. The image processing apparatus according to claim 1, further comprising an acquisition device configured to acquire information about spot areas to be processed when the light emitted from the light emitting elements is/are focused by the lenses,
wherein, based on the information about the spot areas acquired by the acquisition device, the halftone processor selects a dither matrix of the plurality of dither matrices to be used for the halftone processing.

8. The image processing apparatus according to claim 7, wherein, as the information about the spot areas, the acquisition device acquires a distortion direction of each spot area relative to the first direction or of the spot areas relative to the first direction.

9. The image processing apparatus according to claim 8, wherein the halftone processor performs the halftone processing by selecting either one of the first and the second dither matrices corresponding to a halftone dot pattern having more lighting contour pixels obliquely adjacent in the same oblique direction as the distortion direction(s) acquired by the acquisition device.

10. The image processing apparatus according to claim 7, wherein, as the information about the spot areas, the acquisition device acquires a distortion amount of the spot areas.

11. The image processing apparatus according to claim 10, wherein, when the distortion amount acquired by the acquisition device is smaller than an allowable threshold value, the halftone processor performs the halftone processing by selecting a preset dither matrix out of the first and the second dither matrices.

12. The image processing apparatus according to claim 7, wherein, as the image data, the acquisition device acquires the information about the spot areas based on density variations in a test image formed by using preset test image data.

13. The image processing apparatus according to claim 12, wherein the test image data is halftone dot image data of a line screen oblique to the first direction.

14. The image processing apparatus according to claim 13, wherein the information about the spot areas is acquired based on density difference between the test images formed by using a plurality of the test image data having different oblique directions.

15. The image processing apparatus according to claim 1, wherein the halftone processor further operates to:
based on position information of a target pixel, derive phase information indicating a first-directional relative position of a light emitting element corresponding to the target pixel, relative to the lenses that allow passage mainly of the light emitted from the light emitting element corresponding to the target pixel; and
select, as a dither matrix to be used for the halftone processing, one of a plurality of the dither matrices corresponding to the derived phase information.

16. The image processing apparatus according to claim 1, wherein the halftone processor further operates to:
derive phase information as a combination of position information of a target pixel and information about a light emitting element corresponding to the target pixel;
select one of a plurality of the dither matrices as a dither matrix corresponding to the derived phase information; and
perform halftone processing by using the selected dither matrix to generate the image data.

17. The image processing apparatus according to claim 15, wherein the halftone processor selects, as a dither matrix corresponding to the phase information, one of a plurality of the dither matrices corresponding to a halftone dot pattern having more lighting contour pixels obliquely adjacent in a predetermined direction in which a difference between an adjacent arrangement direction of the halftone dot pattern and a distortion direction of each spot area relative to the first direction or of the spot areas irradiated with the light emitted from the light emitting element corresponding to the target pixel is smaller than a fixed value.

18. The image processing apparatus according to claim 16, wherein the halftone processor selects, as a dither matrix corresponding to the phase information, one of a plurality of the dither matrices corresponding to a halftone dot pattern having more lighting contour pixels obliquely adjacent in a predetermined direction in which a difference between an adjacent arrangement direction of the halftone dot pattern and a distortion direction of each spot area relative to the first direction or of the spot areas irradiated with the light emitted from the light emitting element corresponding to the target pixel is smaller than a fixed value.

19. A method for controlling an image processing apparatus to generate image data to be used by an image forming apparatus to perform image forming, the image forming apparatus including, a plurality of light emitting elements disposed at first intervals in a first direction, and configured to emit optical beams based on the image data, and a plurality of lenses disposed at second intervals different from the first intervals in the first direction, and configured to focus the light emitted from the plurality of the light emitting elements on an image plane, the method comprising:

performing halftone processing by using a dither matrix, wherein the dither matrix is selected from a plurality of dither matrices corresponding to a relative fixed positional difference between a position of each of the plurality of light emitting elements and a position of each of the plurality of lenses, and
generating the image data.

\* \* \* \* \*